(12) United States Patent
Matsushita et al.

(10) Patent No.: US 8,174,628 B2
(45) Date of Patent: May 8, 2012

(54) MOBILE TERMINAL UNIT, DISPLAY METHOD, DISPLAY PROGRAM, AND RECORDING MEDIUM

(75) Inventors: Yoshiteru Matsushita, Chiba (JP); Masanori Honda, Higashihiroshima (JP); Kiyoshi Suzuki, Higashihiroshima (JP); Minoru Takemoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1215 days.

(21) Appl. No.: 11/912,113

(22) PCT Filed: Aug. 30, 2006

(86) PCT No.: PCT/JP2006/317116
§ 371 (c)(1),
(2), (4) Date: Oct. 19, 2007

(87) PCT Pub. No.: WO2007/077649
PCT Pub. Date: Jul. 12, 2007

(65) Prior Publication Data
US 2009/0051830 A1    Feb. 26, 2009

(30) Foreign Application Priority Data
Jan. 6, 2006    (JP) ................. 2006-001860

(51) Int. Cl.
*H04N 5/64*    (2006.01)

(52) U.S. Cl. ...................... 348/836; 348/837

(58) Field of Classification Search .......... 348/836, 348/837, 838, 839
See application file for complete search history.

(56) References Cited

U.S. PATENT DOCUMENTS

| | | |
|---|---|---|
| 2001/0008582 A1 | 7/2001 | Sato et al. |
| 2002/0090980 A1 | 7/2002 | Wilcox et al. |
| 2002/0180709 A1 | 12/2002 | Lichtfuss |
| 2005/0096082 A1 | 5/2005 | Chang |
| 2005/0176470 A1 | 8/2005 | Yamakawa |

FOREIGN PATENT DOCUMENTS

| | | |
|---|---|---|
| JP | 11-143386 A | 5/1999 |
| JP | 11-272205 A | 10/1999 |
| JP | 2000-19980 | 1/2000 |
| JP | 2003-43955 | 2/2003 |
| JP | 2003-169120 A | 6/2003 |
| JP | 2003-198683 A | 7/2003 |
| JP | 2003-198689 A | 7/2003 |
| JP | 2004-163568 A | 6/2004 |
| JP | 2004-536475 A | 12/2004 |
| JP | 2005-18492 | 1/2005 |
| JP | 2005-20342 | 1/2005 |
| JP | 2005-114796 A | 4/2005 |
| JP | 2005-215320 | 8/2005 |
| JP | 2005-309086 A | 11/2005 |
| JP | 2005-321702 A | 11/2005 |
| WO | WO-95/21441 | 8/1995 |
| WO | WO-02/47363 A2 | 6/2002 |
| WO | WO-2004/084171 A1 | 9/2004 |
| WO | WO-2005/119406 A1 | 12/2005 |

*Primary Examiner* — Basil Katcheves
(74) *Attorney, Agent, or Firm* — Birch, Stewart, Kolasch & Birch, LLP

(57) ABSTRACT

A flexible LCD (2) is a flexible display. The flexible LCD (2) is pulled out from an upper cabinet to change a display area of the flexible LCD (2). An amount-of-sliding detecting section (4) measures the pullout amount (amount of sliding) of the flexible LCD (2) when the flexible LCD (2) is pulled out from a mobile terminal unit (1) or is retracted into the mobile terminal unit (1). A display controller (3) causes the flexible LCD (2) to display in a manner responsive to the amount of sliding that is measured by the amount-of-sliding detecting section (4). The foregoing makes it possible to utilize effectively the display having a display area that is revealed when the display is pulled out.

12 Claims, 20 Drawing Sheets

F I G. 1 3
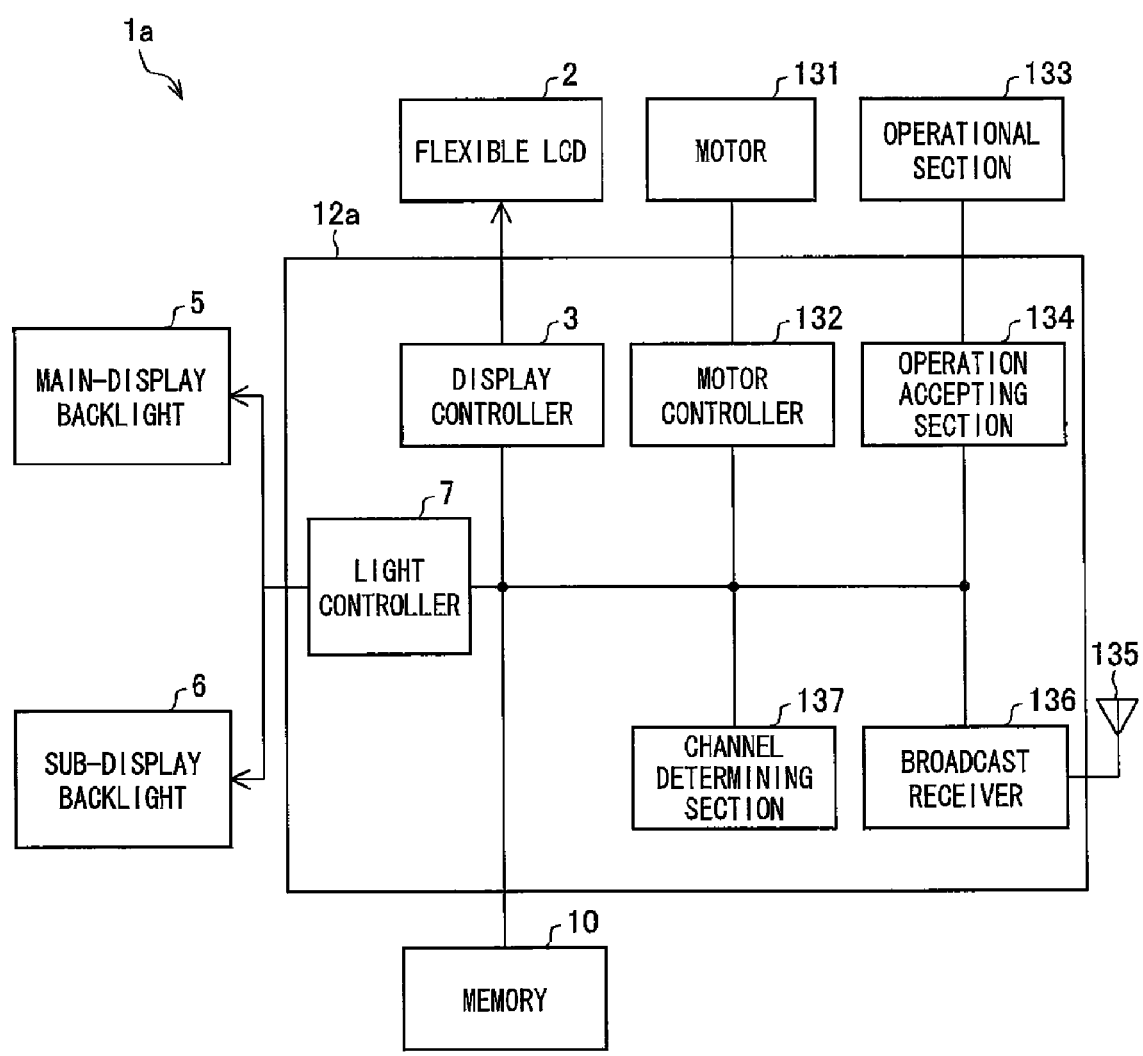

F I G. 1 8 (a)
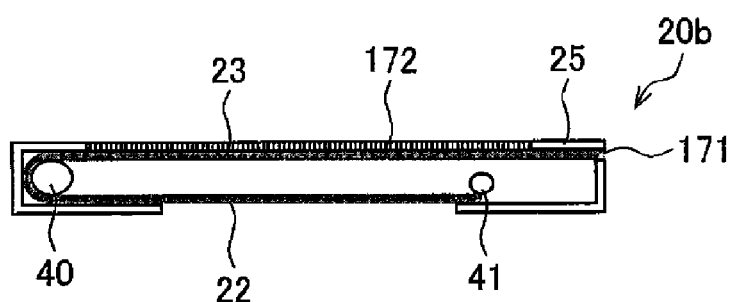
F I G. 1 8 (b)
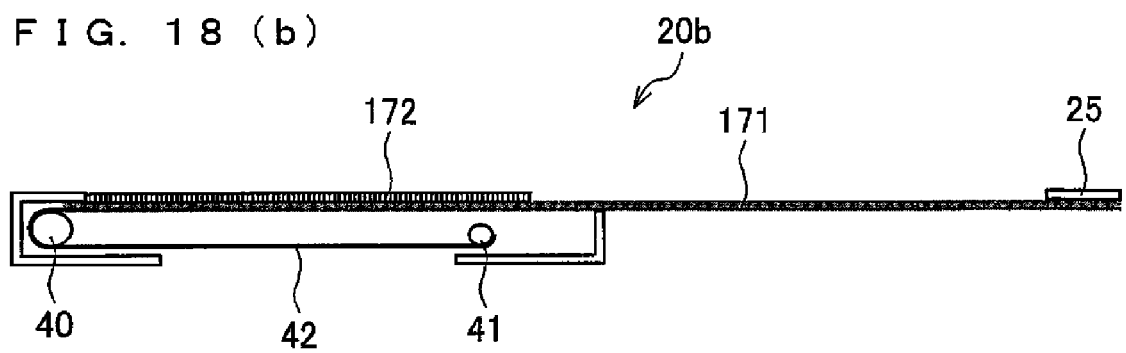

F I G. 1 9
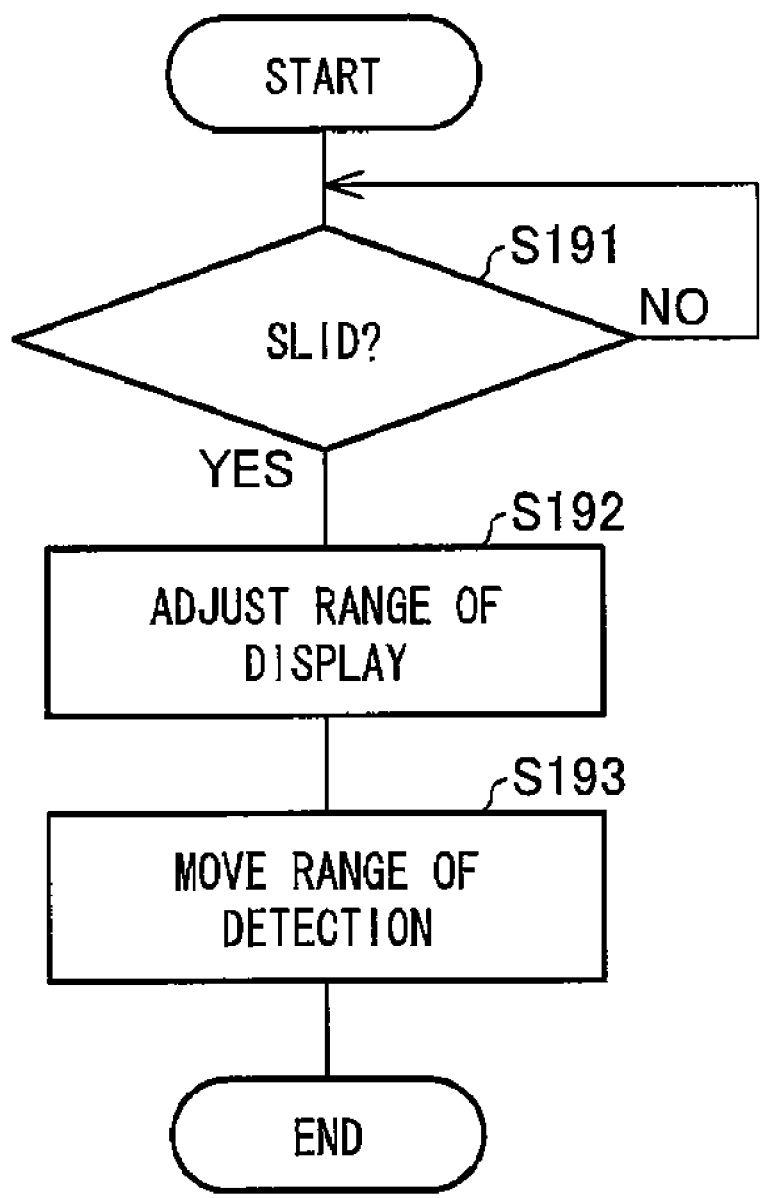

MOBILE TERMINAL UNIT, DISPLAY METHOD, DISPLAY PROGRAM, AND RECORDING MEDIUM

TECHNICAL FIELD

The present invention relates to a mobile terminal unit with a pullout display that is to be pulled out, a display method, a display program, and a recording medium.

BACKGROUND ART

Over the recent years, mobile terminal units such as mobile phones have been improved in functionality. For example, there have been developed mobile phones with which it is possible to enjoy not only audio communications but also communications using texts or images, such as sending/receiving electronic mails and browsing the Internet. To make text information or image information viewable on the mobile phones, upsizing of displays has been demanded. At the same time, smaller and lighter terminals have been demanded to make the terminals easy to carry.

To meet the demands, there have been known techniques for upsizing a display area of a display while keeping the body of the mobile terminal small in size.

For example, Publication 1 discloses a mobile terminal unit that is constituted of a main unit and a sliding section. The main unit includes a key operation section and a small liquid crystal display section. The key operation section is provided on a front surface of the main unit, and a user operates keys to input predetermined information. On a front surface of the sliding section, a large liquid crystal display section is provided to display predetermined information for the user. The main unit and the sliding section are each provided with a sliding mechanism in such a manner that the sliding section is slid to move to a rear surface of the main unit.

Publication 2 discloses a mobile phone including a first liquid crystal display section and a second liquid crystal display section. The second liquid crystal display section is mounted inside or on a rear surface section of the mobile phone in such a manner that the second liquid crystal display is not removable and can be freely pulled out and retracted. When taken out, the second liquid crystal display section faces the same direction as the first liquid crystal display section does, and forms, along with the first liquid crystal display section, a multi liquid crystal display section.

Publication 3 discloses a mobile phone including a liquid crystal display section. An external surface of the liquid crystal display section is covered by a transparent plate. The mobile phone also includes a display sheet unit mounted on one side of a main unit of a telephone. The display sheet unit includes a winding shaft and a flexible display sheet. The winding shaft rotates forward and backward freely with electric driving power. The flexible display sheet is wound around the winding shaft. The flexible display sheet is provided so as to come in and out freely between the transparent plate and the liquid crystal display section, when the winding shaft rotates forward and backward. A front surface of the display sheet is formed on a mirror surface or a pattern display surface on which a desired pattern is drawn.

Publication 4 discloses a mobile electronic device including an inner screen to display information. A feature of the electronic device is an outer screen that is configured so as to receive information from the electronic device and to allow the information to be displayed on an electronic optical medium.

According to the foregoing publications, it is possible to provide the mobile terminal unit with a large display so that displaying on a large screen is possible even with a small unit.

[Publication 1] Japanese Unexamined Patent Publication No. 2003-169120 (Publication Date: Jun. 13, 2003)

[Publication 2] Japanese Unexamined Patent Publication No. 2003-198683 (Publication Date: Jul. 11, 2003)

[Publication 3] Japanese Unexamined Patent Publication No. 2003-198689 (Publication Date: Jul. 11, 2003)

[Publication 4] Published Japanese Translation of PCT International Publication for Patent Application, Publication No. 2004-536475 (Publication Date: Dec. 2, 2004)

DISCLOSURE OF INVENTION

With those conventional configuration, however, merely a display is pulled out to upsize its display area. No significant creative is produced in terms of what is to be displayed on the display in what way. Currently, for example merely a full-screen display is shown on a display that is being pulled out to a maximum extent. That is to say, with the conventional configuration, only two ways of display are realized: the display is housed completely; and the display is pulled out completely. Thus, the display that can be pulled out to be increased in size is not utilized effectively.

The present invention is in view of the foregoing problems, and has as an object to provide a mobile terminal unit by which a pullout display to be pulled out from a body is utilized efficiently, a display method, a display program, and a recording medium.

To solve the above problems, a mobile terminal unit of the present invention is adapted so that the mobile terminal unit with a pullout display that is to be pulled out from a body of the mobile terminal unit includes: amount-of-pullout detecting means for detecting a pullout amount by which the pullout display is pulled out; and display controlling means for causing the pullout display to show a display responsive to the pullout amount detected by the amount-of-pullout detecting means.

With this configuration, the mobile terminal unit includes the pullout display. The user, for example, holds one end of the pullout display to pull out the pullout display from the body of the mobile terminal unit. This changes the display area (display screen) of the pullout display. For example the display area becomes larger than that of the pullout display being housed in the body.

In the mobile terminal unit, the amount-of-pullout detecting means detects the pullout amount, which indicates an amount by which the pullout display is pulled out. The display controlling means carries out displaying in a manner responsive to the pullout amount detected by the amount-of-pullout detecting means. The size of the display area of the pullout display is determined in a manner responsive to the pullout amount. Thus, the display controlling means causes information to be suitably displayed on the pullout display in a manner responsive to the current size of the display area of the pullout display. For example, picture images are adjusted in direction and size so as to fit in the display area of the pullout display, whereby the picture images are displayed in a most suitable manner.

Accordingly, the mobile terminal unit produces an advantageous effect that the pullout display is utilized more effectively.

To solve the above problems, a display method of the present invention is adapted so that the display method to be carried out by a mobile terminal unit with a pullout display that is to be pulled out from a body of the mobile terminal unit, includes: detecting a pullout amount by which the pullout display is pulled out; and showing, on the pullout display, a display responsive to the pullout amount detected by amount-of-pullout detecting means.

With this method, the same advantageous effect as that produced by the mobile terminal unit of the present invention is produced.

To solve the above problems, it is preferable that a mobile terminal unit, including a pullout display that is to be pulled out from a body of the mobile terminal unit, of the present invention include display moving means for automatically moving the pullout display to a position responsive to a display size of information that is to be displayed on the pullout display.

With this configuration, the display moving means causes the pullout display to automatically move to a position responsive to the display size of the information that is to be displayed on the pullout display. Thus, the size of the display area of the pullout display is automatically changed in a manner responsive to the display size of the information displayed on the pullout display.

This produces an advantageous effect that the pullout display, which is to be pulled out from the body of the mobile terminal unit, is utilized efficiently in the mobile terminal unit.

To solve the above problems, a mobile terminal unit of the present invention is adapted so that the mobile terminal unit includes a pullout display that is to be pulled out from a body of the mobile terminal unit, the pullout display being flexible to be allowed to bend when housed in the body of the mobile terminal unit, the pullout display, when housed in the body of the mobile terminal unit, being bent to form a first surface and a second surface that are separated by a bent section of the pullout display, at least a part of the first surface being revealed from an external surface of the body of the mobile terminal unit to serve as a first display, and at least a part of the second surface being revealed from a surface, different from the external surface, of the body of the mobile terminal unit to serve as a second display.

With this configuration, the pullout display serves as both the first display and the second display in the mobile terminal unit. For example, one pullout display is used as the first display on a surface of the mobile terminal unit, and at the same time, the same pullout display is used as the second display on another surface at a back of the surface.

This produces an advantageous effect that the pullout display, which is to be pulled out from the body of the mobile terminal unit, is utilized more efficiently in the mobile terminal unit.

The mobile terminal unit is also realizable with a computer. In this case, the computer is caused to operate as each one of the means. Thus, a display program for realizing the mobile terminal unit with a computer is included within the scope of the present invention. A computer-readable recording medium storing the display program is also included within the scope of the present invention.

Figure 1:
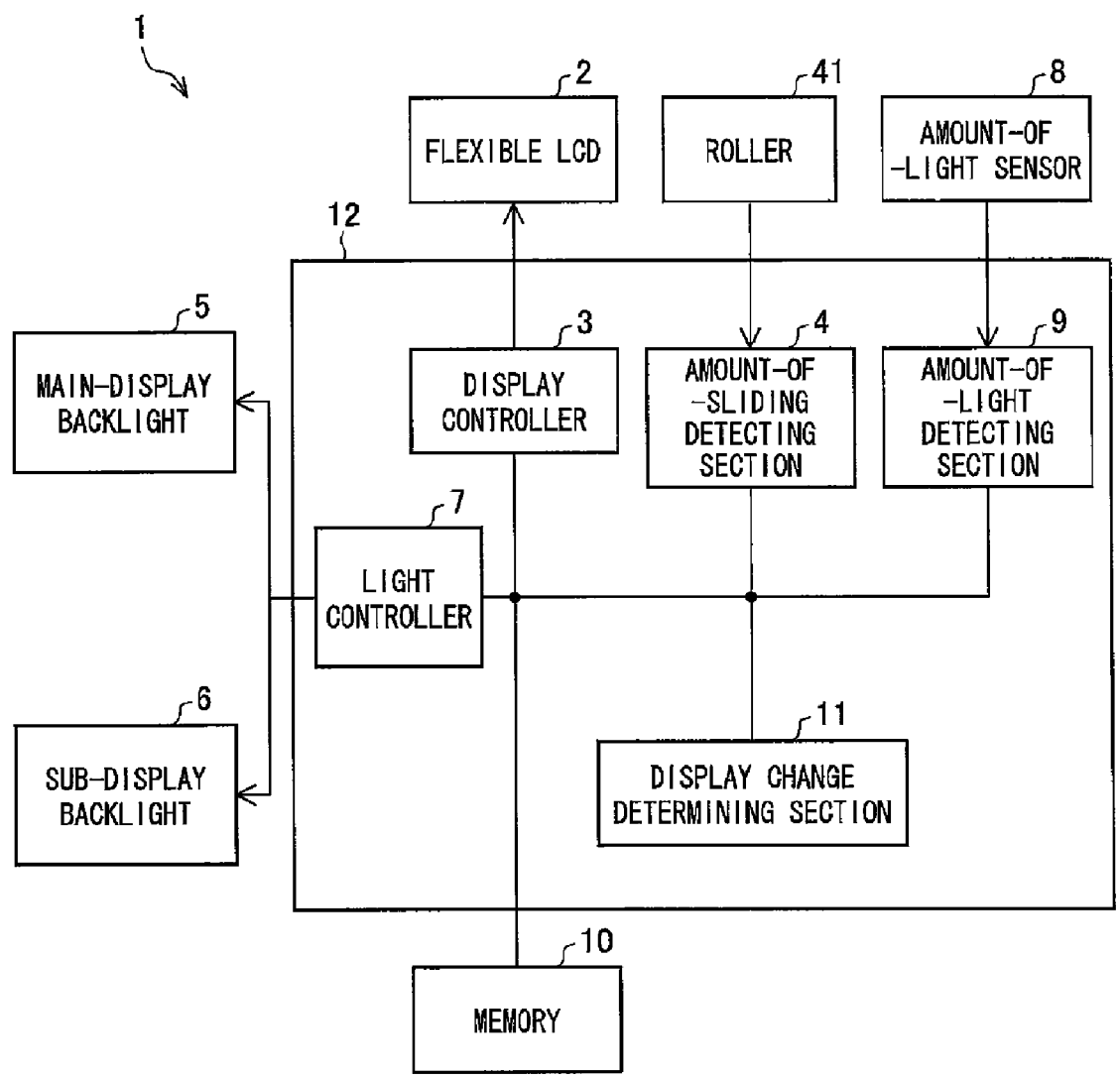
FIG. 1
Figure 2:
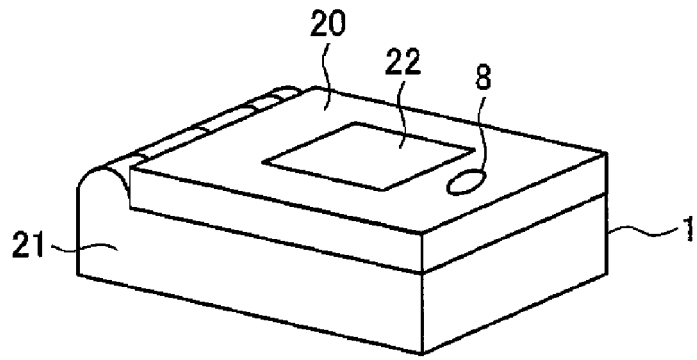
Figure 2:
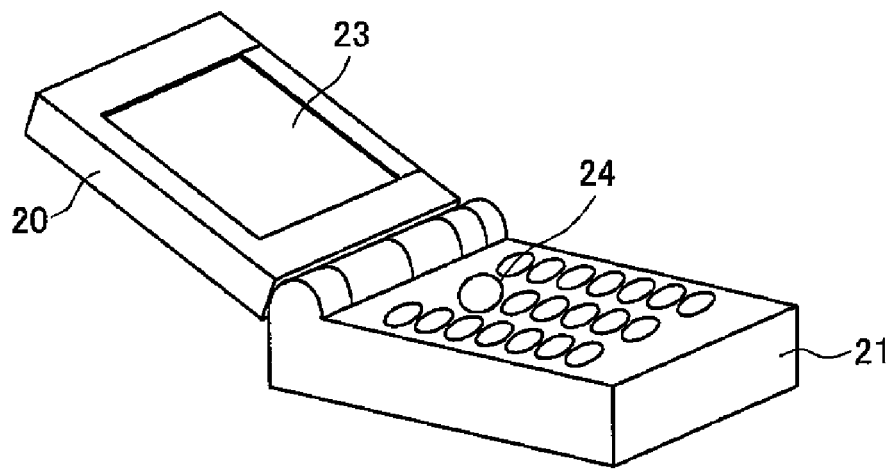
Figure 2:
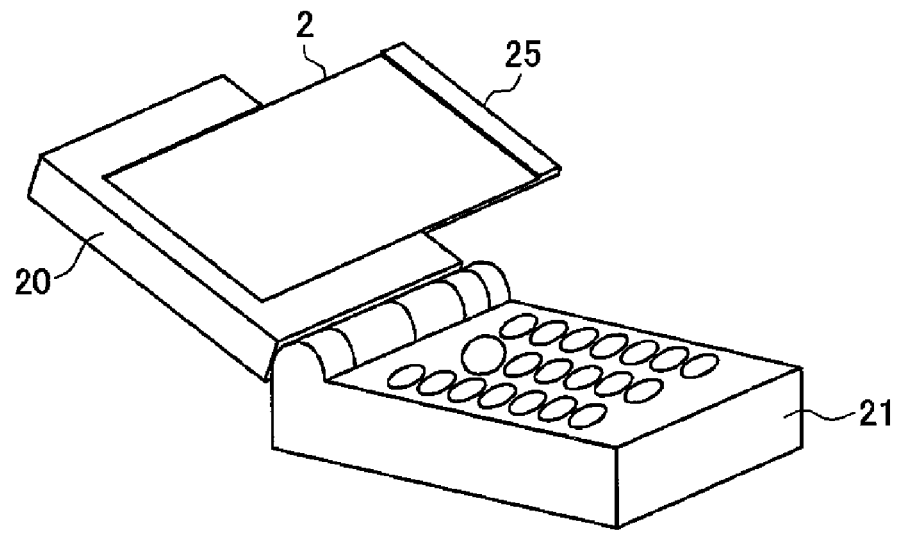

This is a block diagram showing main sections of a mobile terminal unit in accordance with the present invention.

FIG. 2(a)

This is a figure showing an exterior of the mobile terminal unit in a folded state.

FIG. 2(b)

This is a figure showing an exterior of the mobile terminal unit in an opened state.

FIG. 2(c)

This is a figure showing an exterior of the mobile terminal unit with a flexible LCD being pulled out laterally.

FIG. 3(a)

This is a figure illustrating further in detail how the flexible LCD is pulled out from an upper cabinet of the mobile terminal unit, showing a state in which the flexible LCD is housed completely in the upper cabinet.

FIG. 3(b)

This is a figure showing a state in which the flexible LCD is pulled out from the upper cabinet to some extent.

FIG. 3(c)

This is a figure showing a state in which the upper cabinet shown in FIG. 3(b) is viewed from a back side.

FIG. 3(d)

This is a figure showing a state in which a frame of a housing remains in the housing after the flexible LCD is pulled out.

FIG. 4(a)

This is a figure showing a sectional view of the upper cabinet, illustrating a state in which the flexible LCD is housed in the upper cabinet.

FIG. 4(b)

This is a figure showing a state in which the flexible LCD is pulled out from the upper cabinet.

FIG. 5(a)

This is a figure showing a configuration of the upper cabinet further including a backlight to emit light to an area where the pullout section is housed, and a pullout backlight to emit light to the flexible LCD being pulled out from the upper cabinet, illustrating a state in which the flexible LCD is housed in the upper cabinet.

FIG. 5(b)

This is a figure showing a state in which the flexible LCD is pulled out completely from the upper cabinet.

FIG. 6

This is a flowchart showing a flow in a process in which the mobile terminal unit adjusts the amount of light to be emitted from a main-display backlight, in such a manner that the amount of light agrees with the amount of ambient light.

FIG. 7

This is a flowchart showing a flow in a process in which the mobile terminal unit flexibly changes, in a manner responsive to the amount of sliding, what information to be displayed and how the information is displayed on the flexible LCD, when the flexible LCD is pulled out from the upper cabinet.

FIG. 8(a)

This is a figure showing how display shown on the flexible LCD changes in a manner responsive to the amount of sliding of the flexible LCD, illustrating a state of the display at the time when the flexible LCD is housed completely in the upper cabinet.

FIG. 8(b)

This is a figure showing a state of display at the time when the flexible LCD is pulled out slightly from the upper cabinet.

FIG. 8(c)

This is a figure showing a state of display at the time when the flexible LCD is pulled out completely from the upper cabinet.

FIG. 8(d)

This is a figure showing a state of display at the time when the flexible LCD cannot be pulled out any further from the upper cabinet.

FIG. 9

This is a flowchart showing a flow in a process in which the mobile terminal unit scrolls pages of an electronic book in a manner responsive to the amount of sliding of the flexible LCD.

FIG. 10(a)

This is a figure showing how pages of the electronic book are scrolled in a manner responsive to the amount of sliding of the flexible LCD, illustrating a state of display of the electronic book at the time when the flexible LCD is housed completely in the upper cabinet.

FIG. 10(b)

This is a figure showing a state of display of the electronic book at the time when the flexible LCD is slid in the direction in which the flexible LCD is to be pulled out from the upper cabinet.

FIG. 10(c)

This is a figure showing a state of display of the electronic book at the time when the flexible LCD is slid in the direction in which the flexible LCD is retracted into the upper cabinet.

FIG. 10(d)

This is a figure showing a state of display of the electronic book at the time when the flexible LCD is slid again in the direction in which the flexible LCD is to be pulled out from the upper cabinet.

FIG. 11

This is a flowchart showing a flow in a process in which the mobile terminal unit switches a selectable channel in a manner responsive to the amount of sliding of the flexible LCD.

FIG. 12

This is a figure showing a relationship between the amount of sliding of the flexible LCD and the selectable channel.

FIG. 13

This is a block diagram showing a configuration of main sections of the mobile terminal unit in accordance with Embodiment 2 of the present invention.

FIG. 14

This is a plan view of the upper cabinet of the mobile terminal unit, which upper cabinet is viewed from the back side.

FIG. 15(a)

This is a figure showing a sectional view of the upper cabinet, illustrating a state in which the flexible LCD is housed completely in the upper cabinet.

FIG. 15(b)

This is a figure showing a state in which the flexible LCD is pulled out completely from the upper cabinet.

FIG. 16

This is a flowchart showing a flow in a process in which the mobile terminal unit slides the flexible LCD automatically so that the size of the flexible LCD is changed to a suitable size for a channel selected by a user.

FIG. 17

This is a block diagram showing a configuration of main sections of a mobile terminal unit in accordance with Embodiment 3 of the present invention.

FIG. 18(a)

This is a figure showing a sectional view of the upper cabinet, illustrating a state in which a flexible organic EL is housed completely in the upper cabinet.

FIG. 18(b)

This is a figure showing a state in which the flexible organic EL is pulled out completely from the upper cabinet.

FIG. 19

This is a flowchart showing a flow in a process in which, when the flexible organic EL is slid, a touch detection section on a touch panel is moved in a manner responsive to this sliding.

FIG. 20(a)

This is a figure showing a relationship between a position of the flexible organic EL after having been slid and a touch detection area, illustrating a relationship between exemplary display shown on the flexible organic EL and the touch detection area on the touch panel at the time when the flexible organic EL is housed completely in the upper cabinet.

FIG. 20(b)

This is a figure showing a relationship between exemplary display shown on the flexible organic EL and the touch detection area on the touch panel at the time when the flexible organic EL is pulled out from the upper cabinet.

FIG. 20(c)

This is a figure showing a relationship between an exemplary display on the flexible organic EL and the touch detection area on the touch panel at the time when the flexible organic EL is pulled out from the upper cabinet.

FIG. 21(a)

This is a figure showing a speaker transducer mounted on the flexible LCD, illustrating a first speaker transducer mounted on a part of the flexible LCD, which part corresponds to the main display.

FIG. 21(b)

This is a figure showing a second speaker transducer mounted on a part of the flexible LCD, which part corresponds to the sub-display.

FIG. 21(c)

This is a figure showing how the first speaker transducer and the second speaker transducer form stereo speakers at the time when the flexible LCD is pulled out completely.

FIG. 22(a)

This is a figure showing the mobile terminal unit in which the sliding section is not slid.

FIG. 22(b)

This is a figure showing the mobile terminal unit in which the sliding section is being slid.

FIG. 23(a)

This is a figure showing the mobile terminal unit in which a part of a display functions as a sub-display at the time when the sliding section is not being slid.

FIG. 23(b)

This is a figure showing the mobile terminal unit in which the sub-display does not function at the time when the sliding section is being slid.

FIG. 24(a)

This is a figure showing how a television program is displayed on the flexible LCD at the time when the flexible LCD is housed in the upper cabinet.

FIG. 24(b)

This is a figure showing how a data broadcast is displayed, when the flexible LCD is pulled out while the television program is being displayed, on a part of the flexible LCD, which part is being pulled out.

[EXPLANATION OF REFERENCE NUMERALS]

| | |
|---|---|
| 1 | mobile terminal unit |
| 2 | flexible LCD |
| 3 | display controller (display means) |
| 4 | amount-of-sliding detecting section (amount-of-pullout detecting means) |

-continued

[EXPLANATION OF REFERENCE NUMERALS]

| | |
|---|---|
| 5 | main-display backlight for a main display |
| 6 | sub-display backlight for a sub-display |
| 7 | light controller |
| 8 | amount-of-light sensor |
| 9 | amount-of-light detector (amount-of-light detecting means) |
| 10 | memory |
| 11 | display change determining section |
| 20 | upper cabinet (body) |
| 20a | upper cabinet (body) |
| 20b | upper cabinet (body) |
| 21 | lower cabinet |
| 22 | sub-display (first display) |
| 23 | main display (second display) |
| 24 | operational button |
| 25 | pullout section |
| 26 | housing |
| 27 | supporting section |
| 40 | roller |
| 41 | roller |
| 50 | pullout backlight |
| 51 | backlight |
| 131 | motor |
| 132 | motor controller (display moving means) |
| 133 | operational section |
| 134 | operation accepting section |
| 135 | antenna |
| 136 | broadcast receiver |
| 137 | channel determining section |
| 140 | gear |
| 171 | flexible organic EL (pullout display) |
| 172 | touch panel (touched-section detecting member) |
| 173 | input-by-touch detecting section |
| 174 | range-of-detection setting section |
| 201 | enter button |
| 210 | first speaker transducer (sound output member) |
| 211 | second speaker transducer (sound output member) |

BEST MODE FOR CARRYING OUT THE INVENTION

Embodiment 1

The following describes Embodiment 1 of the present invention, with reference to FIGS. 1 to 12. In the present embodiment, a mobile terminal unit 1, which is a clamshell-type mobile terminal unit, including a flexible LCD is described. The flexible LCD is slidable by winding.

(Overview of Mobile Terminal Unit 1)

First of all, the following describes a configuration of main sections of the mobile terminal unit 1 of the present invention, with reference to FIG. 1. FIG. 1 is a block diagram showing the configuration of the main sections of the mobile terminal unit 1 of the present invention.

As shown in FIG. 1, the mobile terminal unit 1 includes a flexible LCD 2 (pullout display), a main-display backlight 5 (backlight) for a main display, a sub-display backlight 6 for a sub-display, an amount-of-light sensor 8, a memory 10, a controller 12, and a roller 41.

The foregoing components except for the controller 12 are realized in the form of hardware devices. The controller 12, on the other hand, is realizable with software as well as hardware logic. The controller 12 includes a display controller 3 (display means), an amount-of-sliding detecting section 4 (amount-of-pullout detecting means), a light controller 7, an amount-of-light detector 9 (amount-of-light detecting means), and a display change determining section 11.

The flexible LCD 2 provided to the mobile terminal unit 1 is a liquid crystal display on which texts or images are to be displayed. As the name "flexible" implies, the flexible LCD 2 is a flexible and bendable display. The flexible LCD 2 is a display to be pulled out from the mobile terminal unit 1. Specifically, the flexible LCD 2 is pulled out from a body of the mobile terminal unit 1 so that a part of a display area of the flexible LCD 2, which part is concealed inside of the body, is revealed outside of the body. Thus, the extent of the revealed part of the display area of the flexible LCD 2 changes in a manner that depends on the pullout amount. Details of the flexible LCD 2 will be described later.

The amount-of-light sensor 8 provided to the mobile terminal unit 1 is a hardware component having a light receiving device that detects an amount (intensity) of light and outputs an electric signal indicating the amount of light thus detected. The amount-of-light detector 9 digitalizes the electric signal that is output by the amount-of-light sensor 8, thereby generating amount-of-light data indicating the detected amount of light.

(Exterior of Mobile Terminal Unit 1)

The following describes an exterior of the mobile terminal unit 1, with reference to FIGS. 2(a) to 2(c). FIGS. 2(a) to 2(c) show the exterior of the mobile terminal unit 1. Specifically, FIG. 2(a) is a figure showing the mobile terminal unit 1 in a folded state. FIG. 2(b) is a figure showing the exterior of the mobile terminal unit 1 in an opened state. FIG. 2(c) is a figure showing the exterior of the mobile terminal unit 1 with the flexible LCD 2 being pulled out laterally.

The mobile terminal unit 1 is a folding unit, so-called clamshell-type unit. As shown in FIG. 2(a), the mobile terminal unit 1 includes an upper cabinet 20 equipped with the flexible LCD 2, and a lower cabinet 21. To operate, a user holds the lower cabinet 21. The amount-of-light sensor 8 discussed above is provided to the upper cabinet 20. Further, a sub-display 22 is provided on a surface of the upper cabinet 20, on which surface the amount-of-light sensor 8 is provided.

When the mobile terminal unit 1 shown in FIG. 2(a) is opened, the upper cabinet 20 is moved away from the lower cabinet 21 as shown in FIG. 2(b). A main display 23 is provided on an opposite side of the upper cabinet 20 to the side where the sub-display 22 is provided, as shown in FIG. 2(b). Both of the sub-display 22 and the main display 23 constitute a part of the flexible LCD 2. That is to say, in the mobile terminal unit 1, a single flexible LCD 2 is used in such a manner that a part of the flexible LCD 2 functions as the sub-display 22 while a different part of the flexible LCD 2 functions as the main display 23. Normally, the size of the main display 23 is larger than that of the sub-display 22. Thus, in the mobile terminal unit 1, images or text messages in large volume are displayed on the main display 23, and information that is additional and little in amount, such as a current time and a message to notify incoming calls/mails, is displayed on the sub-display 22.

In the mobile terminal unit 1, the size of the main display 23 and that of the sub-display 22 may be the same. The size of the sub-display 22 may be larger than that of the main display 23. The information to be displayed on the main display 23 and on the sub-display 22 by the mobile terminal unit 1 is not limited to the information mentioned above, and any information may be displayed.

In the mobile terminal unit 1, the flexible LCD 2 is pulled out from the upper cabinet 20 so that use of the flexible LCD 2 that is increased in size becomes possible. Specifically, a pullout section 25 is provided at one end of the flexible LCD 2 as shown in FIG. 2(c). If the user holds the pullout section 25 and pulls the flexible LCD 2 to the right hand side, the flexible LCD 2 is pulled out from the upper cabinet 20. Consequently, a display section that is concealed inside of the upper cabinet 20 is revealed. This allows the user to use the flexible LCD 2 with a display area of increased size.

(Pull-Out of the Flexible LCD 2)

Figure 3:
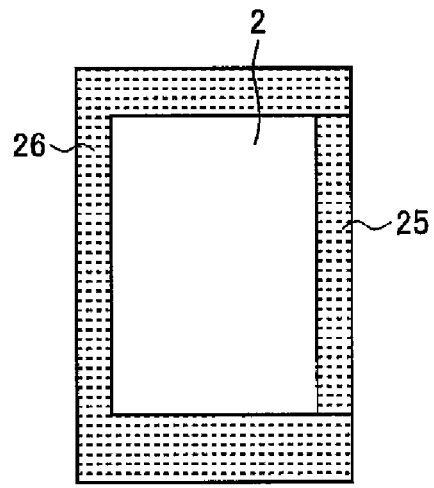
Figure 3:
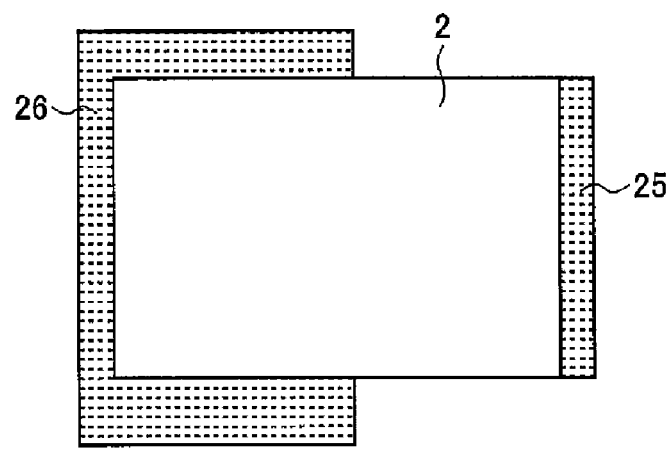
Figure 3:
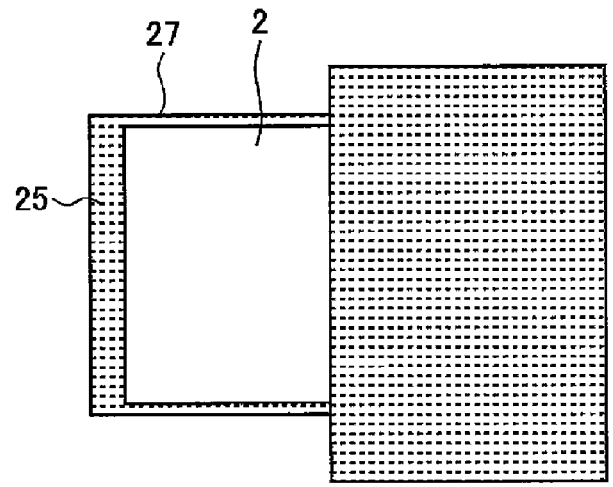
Figure 3:
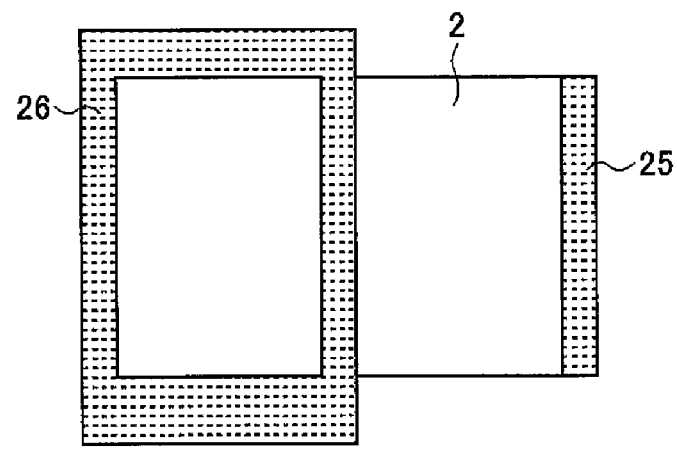

FIGS. 3(*a*) to 3(*d*) are figures illustrating further in detail how the flexible LCD 2 is pulled out from the upper cabinet 20 in the mobile terminal unit 1. Specifically, FIG. 3(*a*) is a figure showing a state in which the flexible LCD 2 is housed completely in the upper cabinet 20. FIG. 3(*b*) is a figure showing a state in which the flexible LCD 2 is pulled out from the upper cabinet 20 to some extent. FIG. 3(*c*) is a figure showing a state in which the upper cabinet 20 shown in FIG. 3(*b*) is viewed from a back side. FIG. 3(*d*) is a figure showing a state in which a part of a frame that constitutes the housing 26 after the flexible LCD 2 is pulled out remains in the housing 26.

The upper cabinet 20 includes the housing 26. In the mobile terminal unit 1, the pullout section 25 provided at one end of the flexible LCD 2 constitutes a part of the housing 26 as shown in FIG. 3(*a*). The housing 26 and the pullout section 25 are made of same material and designed similarly in appearance so that the user feels no oddness.

As shown in FIG. 3(*b*), the user holds the pullout section 25, which is a part of the housing 26, and pulls the pullout section 25 to the right hand side of the mobile terminal unit 1 so that the flexible LCD 2 is pulled out from the upper cabinet 20. When pulled out, the flexible LCD 2 is kept straight without bending. This is due to a supporting section 27 provided at both end sections of a rear surface of the flexible LCD 2 so as to stabilize the flexible LCD 2. The supporting section 27 is provided in straight lines along the same direction as a direction in which the flexible LCD 2 is to be slid, as shown in FIG. 3(*c*). The supporting section 27 is made of hard material that does not bend. The supporting section 27 supports the flexible LCD 2 so that the flexible LCD 2 is kept straight without bending when pulled out from the upper cabinet 20. Thus, after pulling out the flexible LCD 2, the user does not intentionally have to keep the flexible LCD 2 straight so as to prevent the flexible LCD 2 from bending. This further improves ease (usability) of use of the mobile terminal unit 1 for the user.

In the configuration shown in FIG. 3(*d*), a part of the frame constituting the housing 26 remains in the housing 26 even if the flexible LCD 2 is pulled out from the upper cabinet 20. At this time, a part of a display screen of the flexible LCD 2 is covered and concealed by the frame that remains in the housing 26, and therefore the display screen is separated. In other words, with the configuration shown in FIG. 3(*d*), it is difficult for the user to see the display screen of the flexible LCD 2. Therefore, the configuration shown in FIG. 3(*a*) is preferable.

If the supporting section 27 is not provided on the rear surface, the flexible LCD 2 bends naturally due to the weight of the flexible LCD 2 or the weight of the pullout section 25 when pulled out from the upper cabinet 20. In this case, the user needs to stretch the flexible LCD 2 intentionally to keep the flexible LCD 2 straight. This degrades ease of use of the mobile terminal unit 1 for the user. To solve this problem, the supporting section 27 is provided on the rear surface of the flexible LCD 2 in the mobile terminal unit 1 of the present invention, as described above.

(Materials of the Supporting Section 27)

Materials of the supporting section 27 may be any material, as long as the material is hard and prevents bending, such as the material of the housing 26. For example the supporting section 27 may be made of metal. In place of the supporting section 27, a pile of thermoset resin sheets stuck together may be adhered to the rear surface of the flexible LCD 2. In this case, the thermoset sheet is cooled and hardens when the flexible LCD 2 is pulled out from the upper cabinet 20. Thus, the thermoset sheet is stabilized to support the flexible LCD 2 in the same manner as in the case in which the supporting section 27 is provided.

The supporting section 27 may be made of shape-memory alloy. In this case, when the flexible LCD 2 is pulled out from the upper cabinet 20, the shape-memory alloy is cooled to harden into the shape of a straight line. As a result, the supporting section 27 is hardened so that, in the same manner as in the case in which the thermoset sheet is used, the flexible LCD 2 is supported and prevented from bending.

(How the Flexible LCD 2 is Taken In and Out)

As mentioned above, the flexible LCD 2 is a liquid crystal display with flexibility. The term "flexibility" here is interpreted in broad meanings. The flexible LCD 2 with flexibility is realizable by a liquid crystal display constituted of a substrate serving as a base and having a property of bendability. The flexible LCD 2 is also realizable by a shutter-shaped liquid crystal display constituted of strips of liquid crystal display panels that are coupled. Each coupling section between the strips of display panels bends, whereby the flexible LCD 2 as a whole has the property of bendability.

Utilizing the flexibility the flexible LCD 2 has, the user can store the flexible LCD 2 inside of the mobile terminal unit 1, with the flexible LCD 2 being bent. Further, if the flexible LCD 2 in this state is pulled out, use of the flexible LCD 2 that is increased in size becomes possible. The following describes how the foregoing is carried out, with reference to FIG. 4.

Figure 4:
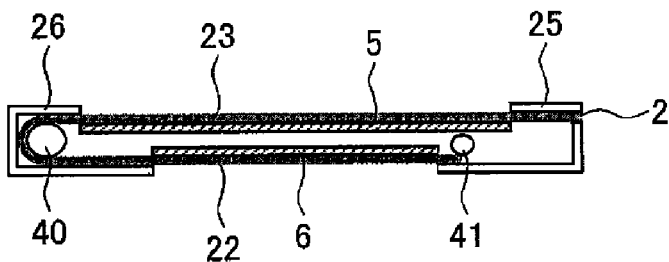
Figure 4:
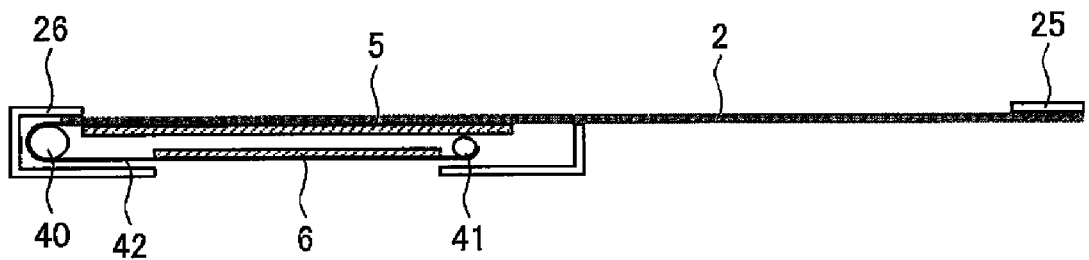

FIGS. 4(*a*) and 4(*b*) each show a sectional view of the upper cabinet 20. Specifically, FIG. 4(*a*) is a figure showing a state in which the flexible LCD 2 is housed in the upper cabinet 20, and FIG. 4(*b*) is a figure showing a state in which the flexible LCD 2 is pulled out from the upper cabinet 20.

As described above, the pullout section 25 is provided at one end of the flexible LCD 2. The user holds the pullout section 25 to pull the flexible LCD 2 so that the flexible LCD 2 is pulled out from the upper cabinet 20. A sheet 42, which is windable, is provided at the other end of the flexible LCD 2. In the state shown in FIG. 4(*a*), the sheet 42 is wound completely around the roller 41. When the flexible LCD 2 is pulled out, the sheet 42 is stretched to change from a wound state to an extended state.

The amount-of-sliding detecting section 4 described above measures the amount of rotation of the roller 41 to measure the amount of sliding (pullout amount) of the flexible LCD 2. The method by which the amount-of-sliding detecting section 4 measures the amount of sliding of the flexible LCD 2 is not limited to the method described above.

Both of the main-display backlight 5 and the sub-display backlight 6 are rigidly mounted on the substrate in the upper cabinet 20. In other words, the main-display backlight 5 and the sub-display backlight 5 are not integral with the flexible LCD 2. Thus, when the flexible LCD 2 is slid to be pulled out from the upper cabinet 20, both of the main-display backlight 5 and the sub-display backlight 5 are rigidly mounted and therefore do not move. Thus, the main-display backlight 5 and the sub-display backlight 5 are not pulled out from the upper cabinet 20.

(Arrangement of the Backlight)

As shown in FIG. 4(*a*), when the flexible LCD 2 is housed completely in the upper cabinet 20, a part of the flexible LCD 2 faces the front surface of the upper cabinet 20, and the other part of the flexible LCD 2 faces the rear surface of the upper cabinet 20. The term "front surface" here implies a surface of the upper cabinet 20, on which surface the main display 23 is provided. On the other hand, the term "rear surface" here implies a surface on the opposite side of the "front surface", on which surface the sub-display 22 is provided. The part of the flexible LCD 2 that faces the front surface of the upper cabinet 20 is arranged to be parallel to the main-display backlight 5. On the other hand, the part of the flexible LCD 2 that faces the rear surface is arranged to be parallel to the sub-display backlight 6.

In the mobile terminal unit 1, the light controller 7 controls the main-display backlight 5 and the sub-display backlight 5. Specifically, the light controller 7 applies, via the main-display backlight 5, light onto the part of the flexible LCD 2 that functions as the main display 23. On the other hand, the light controller 7 applies, via the sub-display backlight 5, light onto the part of the flexible LCD 2 that functions as the sub-display 22. Thus, the part of the flexible LCD 2 that faces the front surface of the upper cabinet 20 functions as the main display 23. On the other hand, the part of the flexible LCD 2 that faces the rear surface of the upper cabinet 20 functions as the sub-display 22.

As shown in FIG. 4(b), when the upper cabinet 20 is pulled to the right hand side, the flexible LCD 2 is pulled out from the upper cabinet 20. At this time, the flexible LCD 2 is slid while being in contact with the roller 40. Consequently, the flexible LCD 2 changes from a state in which the flexible LCD 2 is bent to a state in which the flexible LCD 2 is stretched straight. The flexible LCD 2 no longer faces the sub-display backlight 5, and stops functioning as the sub-display 22. Thus, in the mobile terminal unit 1, the light controller 7 causes the sub-display backlight 5 to become off when the amount-of-sliding detecting section 4 detects that the flexible LCD 2 is slid. This prevents unnecessary power consumption by the mobile terminal unit 1.

When the flexible LCD 2 is pulled out from the upper cabinet 20 completely, the sheet 42 is positioned so as to cover the sub-display backlight 5 completely. This prevents the sub-display backlight 5 of the mobile terminal unit 1 from being revealed.

It is preferable that the color of the sheet 42 be same as that of the housing 26. It is also preferable that the pattern on an external surface of the sheet 42 be same as that on an external surface of the housing 26. The foregoing allows the sheet 42 and the housing 26 to appear in one unit without oddness, improving the appearance.

It is preferable that a predetermined arrangement be made to show, on a part of the sheet 42, which part covers the sub-display backlight 6 and is revealed from the housing 26, that the flexible LCD 2 cannot be pulled out any further. For example, a sentence "LCD CANNOT BE PULLED OUT" may be shown on the revealed surface. Alternatively, colors or patterns, such as yellow tape and red tape on a power cord of a vacuum cleaner, may be provided to notify the user that the pullout reaches the limitation.

(Other Backlights)

Figure 5:
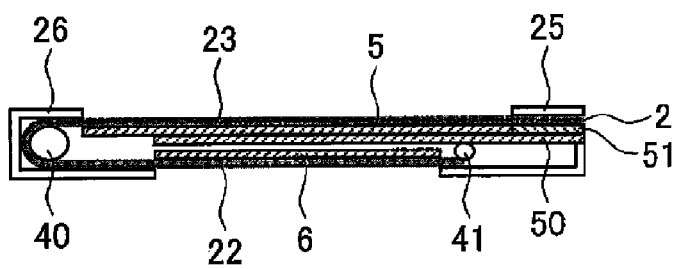
Figure 5:
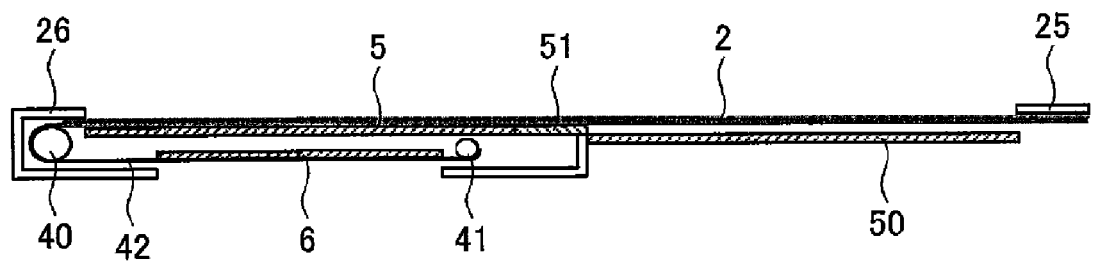

The upper cabinet 20 may be configured as shown in FIG. 5. FIGS. 5(a) and 5(b) are figures each showing a configuration of the upper cabinet 20 including a backlight 51 and a pullout backlight 50. The backlight 51 applies light onto a section where the pullout section 25 is housed. The pullout backlight 50 applies light onto the flexible LCD 2 that is being pulled out from the upper cabinet 20. Specifically, FIG. 5(a) is a figure showing a state in which the flexible LCD 2 is housed in the upper cabinet 20, and FIG. 5(b) is a figure showing a state in which the flexible LCD 2 is pulled out completely from the upper cabinet 20.

The upper cabinet 20 shown in FIG. 5(a) includes, in addition to the main-display backlight 5 and the sub-display backlight 5, the pullout backlight 50 and the backlight 51. The pullout backlight 50 is a light source to apply light all over the flexible LCD 2 that is being pulled out from the upper cabinet 20. The backlight 51 is a light source to apply light onto a part of the flexible LCD 2, on which part the pullout section 25 used to exist, when the flexible LCD 2 is pulled out from the upper cabinet 20.

As shown in FIG. 5(b), when the flexible LCD 2 is pulled out completely from the upper cabinet 20, the pullout backlight 50 also moves along with the flexible LCD 2 and is pulled out from the upper cabinet 20. In the upper cabinet 20, the backlight 51 comes into contact with the back side of the flexible LCD 2 at where the pullout section 25 used to exist. When the amount-of-sliding detecting section 4 determines that the flexible LCD 2 is pulled out from the upper cabinet 20, the light controller 7 causes the pullout backlight 50 and the backlight 51 to become on. Thus, the same amount of light is applied all over the flexible LCD 2 that is being pulled out from the upper cabinet 20. In other words, light of the same illumination is applied to a part of the flexible LCD 2, which part used to be concealed by the pullout section 25.

The backlight 51 may be a part of the main-display backlight 5. In this case, the light controller 7 causes a part of the main-display backlight 5, which part is the backlight 51, to become off when the flexible LCD 2 is housed in the upper cabinet 20. On the other hand, the light controller 7 causes the entire part of the main-display backlight 5, including the backlight 51, to become on uniformly when the flexible LCD 2 is pulled out from the upper cabinet 20.

(Control of the Backlights)

In the mobile terminal unit 1, the amount of light to be emitted from the main-display backlight 5 is controllable in a manner responsive to the amount of ambient light, when the flexible LCD 2 is pulled out from the upper cabinet 20. The following describes this control, with reference to FIG. 6.

Figure 6:
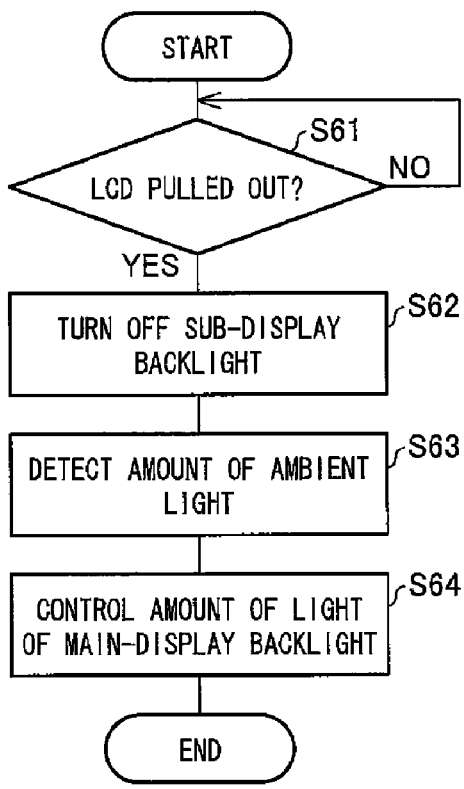

FIG. 6 is a flowchart showing a flow in a process in which the mobile terminal unit 1 adjusts the amount of light to be emitted from the main-display backlight 5, in a manner responsive to the amount of ambient light.

As shown in FIG. 6, first, the amount-of-sliding detecting section 4 determines whether the flexible LCD 2 is pulled out from the upper cabinet 20 (step S61). If a result of this determination is "TRUE" (Yes), then the light controller 7 causes the sub-display backlight 5 to become off (step S62). Thereafter, the amount-of-light detector 9 detects the amount of ambient light via the amount-of-light sensor 8 (step S63). This amount of light indicates intensity of light incident on the back side of the flexible LCD 2 that is being pulled out from the upper cabinet 20. The amount-of-light detector 9 outputs, to the light controller 7, data on the amount of ambient light thus detected.

The light controller 7 controls the main-display backlight 5 so that the main-display backlight 5 emits light of the same intensity as that of the amount of ambient light detected by the amount-of-light detector 9. Consequently, the main-display backlight 5 emits the same amount of light as that of the ambient light around the mobile terminal unit 1, to the part of the flexible LCD 2 that is housed in the upper cabinet 20. Thus, with a single flexible LCD 2, the same amount of light comes incident on the part of the flexible LCD 2 that is being pulled out from the upper cabinet 20 and on the part of the flexible LCD 2 that is being housed in the upper cabinet 20. This stabilizes brightness of display on a screen of the flexible LCD 2 so that the brightness becomes even. That is to say, the flexible LCD 2 does not become extremely dark or bright partially.

(Automatic Adjustment of What to be Displayed in a Manner Responsive to the Pullout Amount)

With the mobile terminal unit 1, descriptions and configurations of information to be displayed on the flexible LCD 2 may be altered flexibly in a manner responsive to the amount of sliding as a result that the flexible LCD 2 is pulled out from the upper cabinet 20. The following describes an exemplary case thereof, with reference to FIGS. 7 and 8.

Figure 7:
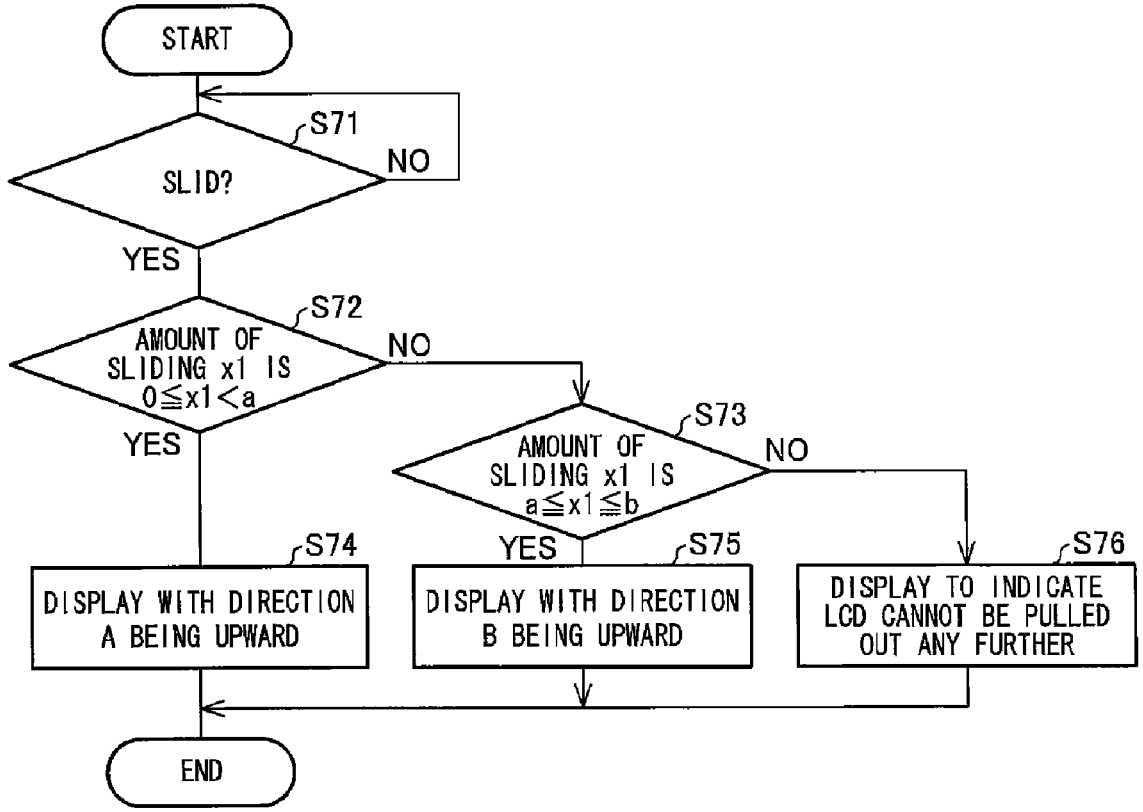
Figure 8:
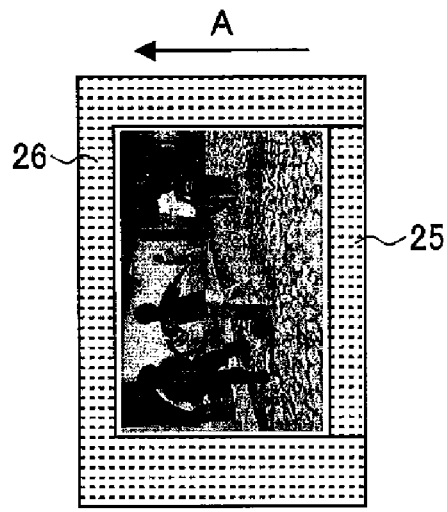
Figure 8:
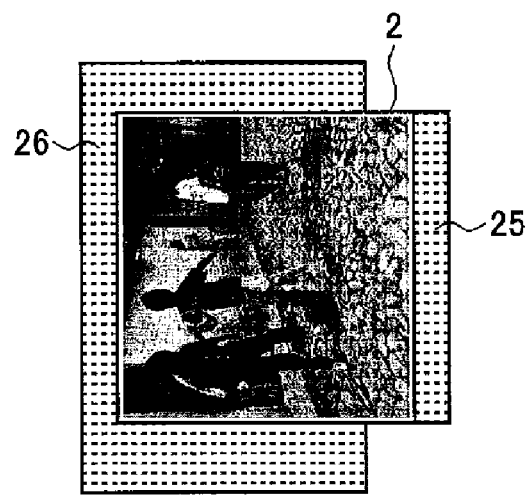
Figure 8:
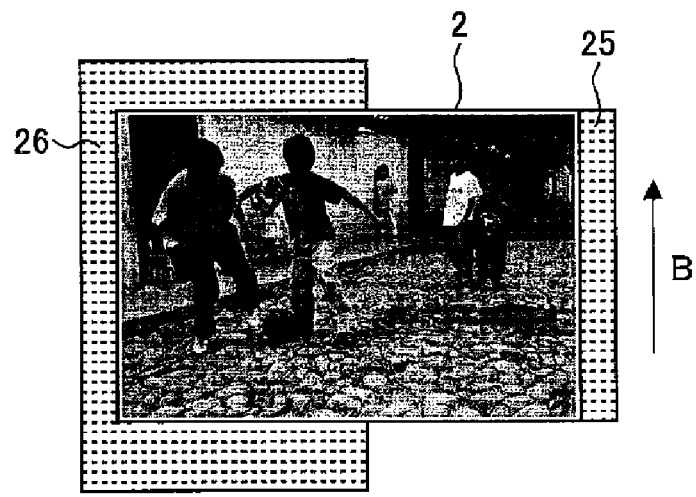
Figure 8:

FIG. 7 is a flowchart showing a flow in a process in which the mobile terminal unit 1 flexibly changes, in a manner responsive to the amount of sliding, what information to be displayed and how the information is displayed on the flexible LCD 2, when the flexible LCD 2 is pulled out from the upper cabinet 20. FIGS. 8(a) to 8(d) are figures each showing how display shown on the flexible LCD 2 changes in a manner responsive to the amount of sliding of the flexible LCD 2. Specifically, FIG. 8(a) is a figure showing a state of display at the time when the flexible LCD 2 is housed completely in the upper cabinet 20. FIG. 8(b) is a figure showing a state of display at the time when the flexible LCD 2 is pulled out slightly from the upper cabinet 20. FIG. 8(c) is a figure showing a state of display when the flexible LCD 2 is pulled out completely from the upper cabinet 20. FIG. 8(d) is a figure showing a state of display at the time when the flexible LCD 2 cannot be pulled out any further from the upper cabinet 20. In the case shown in FIGS. 8(a) to 8(d), the display controller 3 causes the flexible LCD 2 to display received pictures of television broadcasts or photograph images taken with the use of a digital camera.

As shown in FIG. 7, first, the amount-of-sliding detecting section 4 determines whether the flexible LCD 2 is pulled out from the upper cabinet 20 (step S71). If a result of this determination is "TRUE" (Yes), then the amount-of-sliding detecting section 4 measures the amount of sliding and outputs this amount to the display change determining section 11. The display change determining section 11 determines whether the amount of sliding x1 of the flexible LCD 2 satisfies $0 \leq x1 < a$. This "a" is a predetermined value, and is stored in advance in the memory 10 in the mobile terminal unit 1 as a reference amount of sliding. The reference amount functions as a reference in changing an orientation of display of images on the flexible LCD 2.

If the display change determining section 11 determines that the amount of sliding x1 satisfies $0 \leq x1 < a$, then the display controller 3 causes the flexible LCD 2 to display an image in such a manner that a lengthwise orientation of the image accords with arrow A indicated in FIG. 8(a). In other words, the image is displayed in a state in which the image is rotated by 90° anticlockwise from a state defined by data.

Exemplary displays on the screen at this time are shown in FIGS. 8(a) and 8(b). When the flexible LCD 2 is not pulled out from the upper cabinet 20 as shown in FIG. 8(a), a revealed part of the flexible LCD 2 is portrait-oriented and is not wide enough to display a landscape-oriented image. Thus, on the basis of the size of the image and the size of the display area of the main display 23 of the flexible LCD 2 (the size of the display area is determinable on the basis of the amount of sliding), the display change determining section 11 determines that the image is to be displayed in the state in which the image is rotated by 90° anticlockwise. The display change determining section 11 notifies the display controller 3 of this determination. In accordance with the determination, the display controller 3 reads out the image from the memory 10, processes the image so that the image becomes landscape-oriented, and then causes the flexible LCD 2 to display the image.

In the case shown in FIG. 8(b), the display controller 3 causes the image to be extended so as to fit the size of the flexible LCD 2 that is being pulled out. The display controller 3 may cause the image to be displayed simply by changing the position of the image, without extending the image.

On the other hand, if it is determined in step S72 that the amount of sliding x1 of the flexible LCD 2 does not satisfy $0 \leq x1 < a$, the display change determining section 11 then determines whether the amount of sliding x1 satisfies $a \leq x1 \leq b$ (step S73). This "b" is a predetermined value stored in advance in the memory 10 in the mobile terminal unit 1 as a limit of sliding that indicates the limit beyond which the flexible LCD cannot be pulled out further from the upper cabinet 20.

If the display change determining section 11 determines in step S73 that the amount of sliding x1 satisfies $a \leq x1 \leq b$, then the display controller 3 causes the image to be displayed on the flexible LCD 2 in such a manner that a lengthwise orientation of the image is in direction B indicated in FIG. 8(c). In other words, the display change determining section 11 determines at this time that the flexible LCD 2 is pulled out from the upper cabinet 20 sufficiently so that the width is wide enough to display an landscape-oriented image. On the basis of this determination, the display change determining section 11 determines to display the image on the flexible LCD 2 without rotating the image. At this time, the display change determining section 11 also determines to enlarge the image so that the image is displayed on the flexible LCD 2 in full-screen display. In accordance with those determinations, the display controller 3 reads out the image from the memory 10, enlarges the image, and then causes the flexible LCD 2 to display the image in full-screen display without changing the orientation of the image.

On the other hand, if it is determined in step S73 that the amount of sliding x1 does not satisfy $a \leq x1 \leq b$, then the display change determining section 11 determines that the amount of sliding of the flexible LCD 2 is greater than b. At this time, the display change determining section 11 determines to display a message to inform that the flexible LCD cannot be pulled out any further from the upper cabinet 20. In accordance with this determination, the display controller 3 notifies the user that the flexible LCD 2 cannot be pulled out any further from the upper cabinet 20. Specifically, the display controller 3 causes a message "LCD CANNOT BE PULLED OUT ANY FURTHER" to be displayed on the flexible LCD 2 in such a way as to superpose the message onto the image, as shown in FIG. 8(d). Seeing this message, the user is notified for sure that the flexible LCD 2 is pulled out too much.

Besides the case shown in FIG. 8(d), the mobile terminal unit 1 may notify the user that the flexible LCD 2 cannot be pulled out from the upper cabinet 20, by any other ways such as sound and vibration.

(Displaying Texts of an Electronic Book)

With the mobile terminal unit 1, it is possible to scroll pages of an electronic book in a manner responsive to the pullout amount of the flexible LCD 2, which is a different exemplary case from the case in which changing of a state of display on a screen is controlled in a manner responsive to the amount of sliding of the flexible LCD. The following describes details of the process to be carried out in this exemplary case, with reference to FIGS. 9 to 10.

Figure 9:
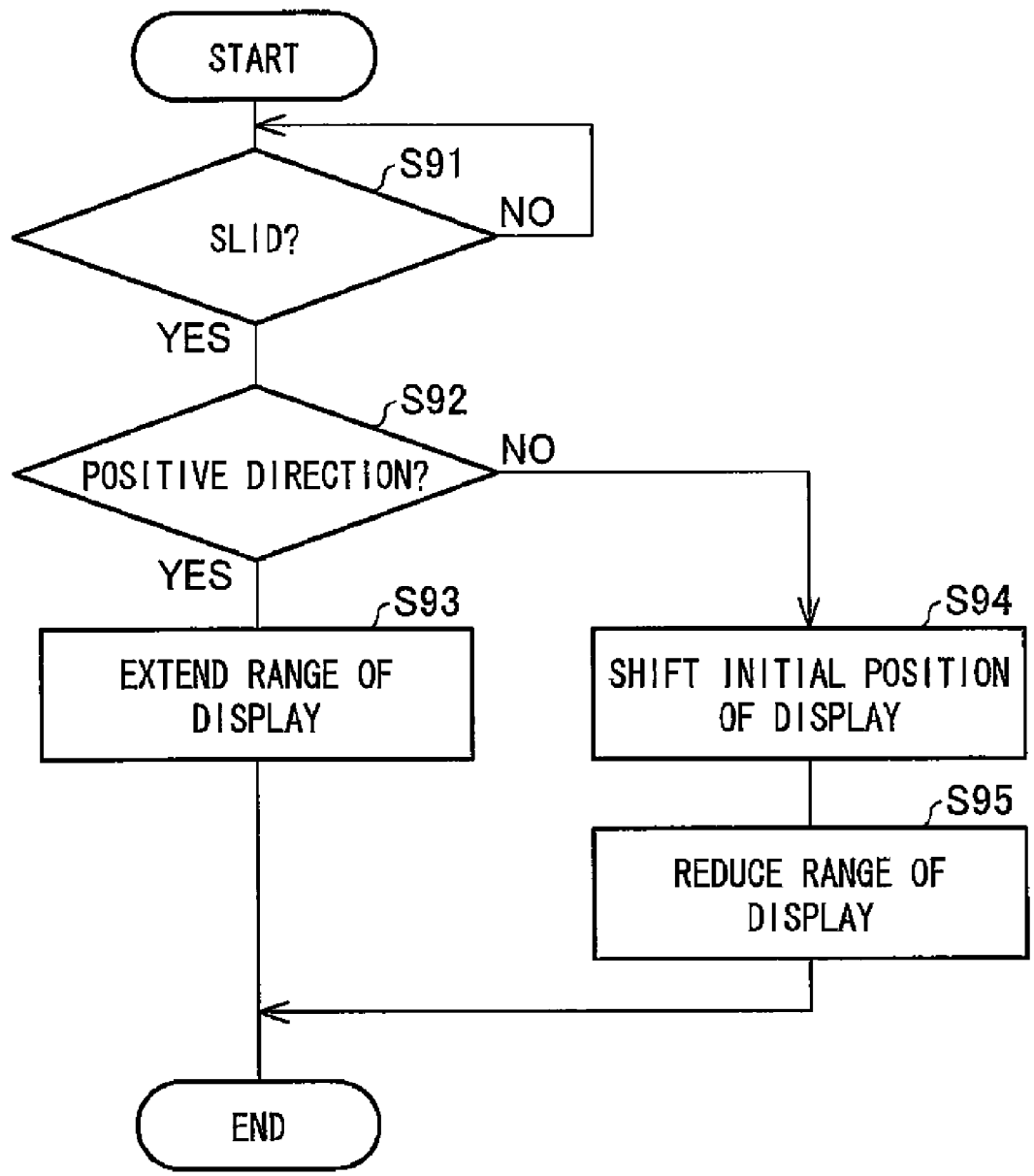
Figure 10:
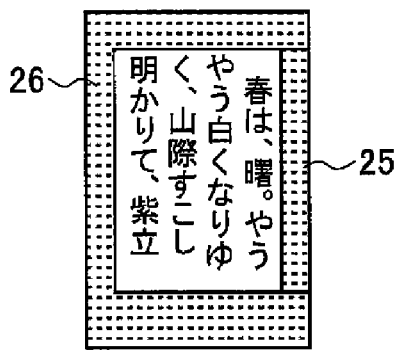
Figure 10:
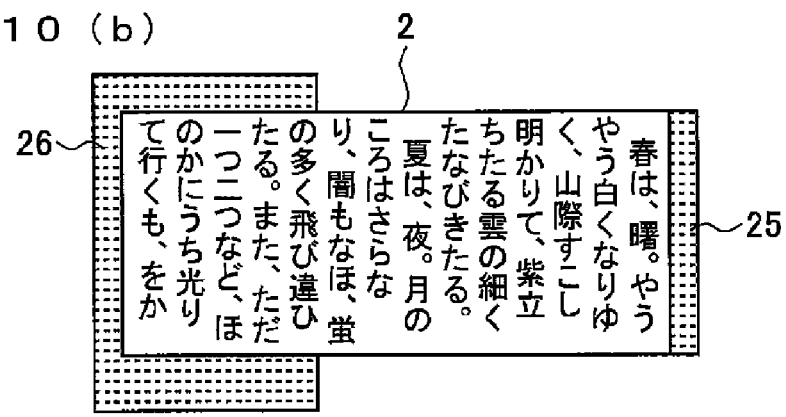
Figure 10:
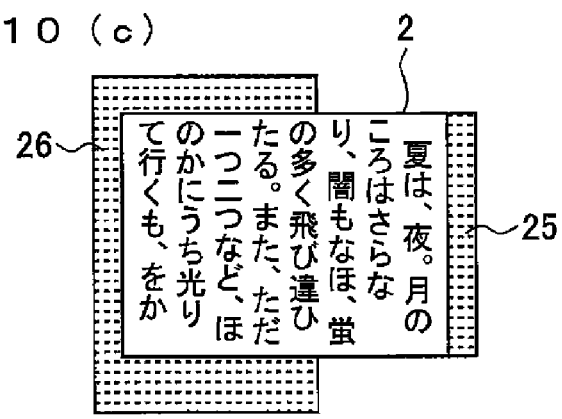
Figure 10:
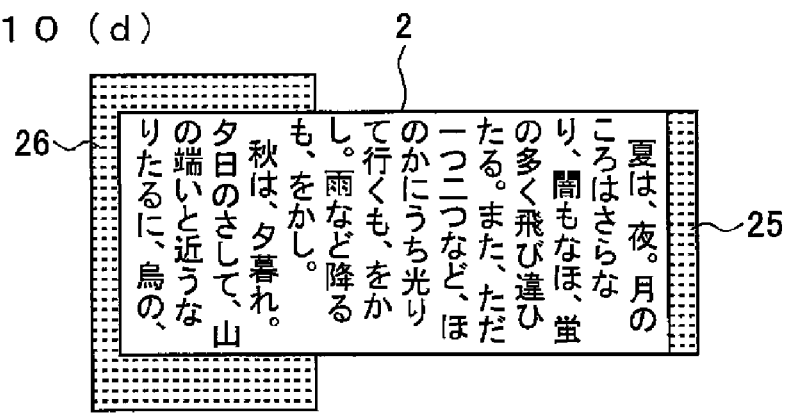

FIG. 9 is a flowchart showing a flow in the process in which the mobile terminal unit 1 scrolls pages of the electronic book in a manner responsive to the amount of sliding of the flexible LCD 2. FIGS. 10(*a*) to 10(*d*) are figures showing a state in which pages of the electronic book are scrolled in a manner responsive to the amount of sliding of the flexible LCD 2. Specifically, FIG. 10(*a*) is a figure showing a state of display of the electronic book at the time when the flexible LCD 2 is housed completely in the upper cabinet 20. FIG. 10(*b*) is a figure showing a state of display of the electronic book at the time when the flexible LCD 2 is slid in the direction in which the flexible LCD 2 is to be pulled out from the upper cabinet 20. FIG. 10(*c*) is a figure showing a state of display of the electronic book at the time when the flexible LCD 2 is slid in the direction in which the flexible LCD 2 is to be retracted into the upper cabinet 20. FIG. 10(*d*) is a figure showing a state of display of the electronic book at the time when the flexible LCD 2 is slid again in the direction in which the flexible LCD 2 is to be pulled out from the upper cabinet 20.

In the mobile terminal unit 1, the electronic book to be displayed on the flexible LCD 2 by the display controller 3 is stored in advance in the memory 10 in the form of text data. As shown in FIG. 10(*a*), when the flexible LCD 2 is housed completely in the upper cabinet 20, the display controller 3 reads out, from the memory 10, texts contained in the first 4 lines of the electronic book and causes the texts to be displayed on the flexible LCD 2.

At this time, the amount-of-sliding detecting section 4 determines whether the flexible LCD 2 is slid (step S91). If a result of this determination is "TRUE" (Yes), then the amount-of-sliding detecting section 4 determines whether the direction in which the flexible LCD 2 is slid is positive (step S92). If the direction of sliding is positive, it implies that the flexible LCD 2 is slid in the direction in which the flexible LCD 2 is to be pulled out from the upper cabinet 20. If determining in step S92 that the direction in which the flexible LCD 2 is slid is positive (Yes), the display change determining section 11 determines to extend a range of display of the flexible LCD 2.

Consequently, the display controller 3, as shown in FIG. 10(*b*), increases the extent of display of the electronic book on the flexible LCD 2 from 4 lines to 14 lines (step S93). At this time, the amount-of-sliding detecting section 4 measures the amount of sliding of the flexible LCD 2, and outputs this amount to the display controller 3. On the basis of the amount of sliding, the display controller 3 calculates a newly revealed part as a consequence of the sliding of the flexible LCD 2. The display controller 3 reads out, from the memory 10, the following texts in the electronic book. The amount of the texts to be read out is equivalent to the amount of texts displayable on the area thus calculated. The display controller 3 then causes the texts to be displayed on the flexible LCD 2. Thus, as the user pulls out the flexible LCD 2 from the upper cabinet 20, the following texts in the electronic book are displayed one after another on the newly revealed part of the flexible LCD 2. At this time, the texts (texts in the first 4 lines) having been displayed are not erased and continue to be displayed.

On the other hand, if determining in step S92 that the direction in which the flexible LCD 2 is slid is not positive (No), then the display change determining section 11 determines to shift an initial position of display of the electronic book on the flexible LCD 2.

Consequently, the display controller 3, as shown in FIG. 10(*c*), shifts the initial position of display in the state of display to the left hand side of the flexible LCD 2, that is to say, the direction in which the flexible LCD 2 is to be retracted into the upper cabinet 20 (step S94). At this time, the amount-of-sliding detecting section 4 measures the amount of sliding of the flexible LCD 2, and outputs this amount to the display controller 3. On the basis of the direction of sliding, the display controller 3 calculates the area of a part of the flexible LCD 2, which part is housed in the upper cabinet 20. In the case shown in FIG. 10(*c*), the display controller 3 calculates that an area equivalent to 6 lines is shifted in a negative direction. Thus, the display controller 3 causes the texts in the first 6 lines from the beginning to be erased from the flexible LCD 2, and causes the remaining 8 lines to continue to be displayed. In other words, the extent of the display of the electronic book is reduced (step S95).

Thus, as shown in FIGS. 10(*b*) and 10(*c*), when the flexible LCD 2 is slid in the direction in which the flexible LCD 2 is to be retracted into the upper cabinet 20, it appears to the user that, in the area of the flexible LCD 2 that continues to be revealed before and after the sliding, the same texts continue to be displayed in the manner as originally displayed.

In the case shown in FIG. 10, the portrait-oriented electronic book is displayed on the flexible LCD 2. In the mobile terminal unit 1, the same process is carried out to display, for example, landscape-oriented web-pages and landscape-oriented images such as maps and photographs by scrolling pages.

(Limiting Selection of Channels)

With the mobile terminal unit 1, it is possible to control selection of television channels in a manner responsive to the amount of sliding of the flexible LCD 2. The following describes an exemplary case thereof, with reference to FIGS. 11 and 12.

Figure 11:
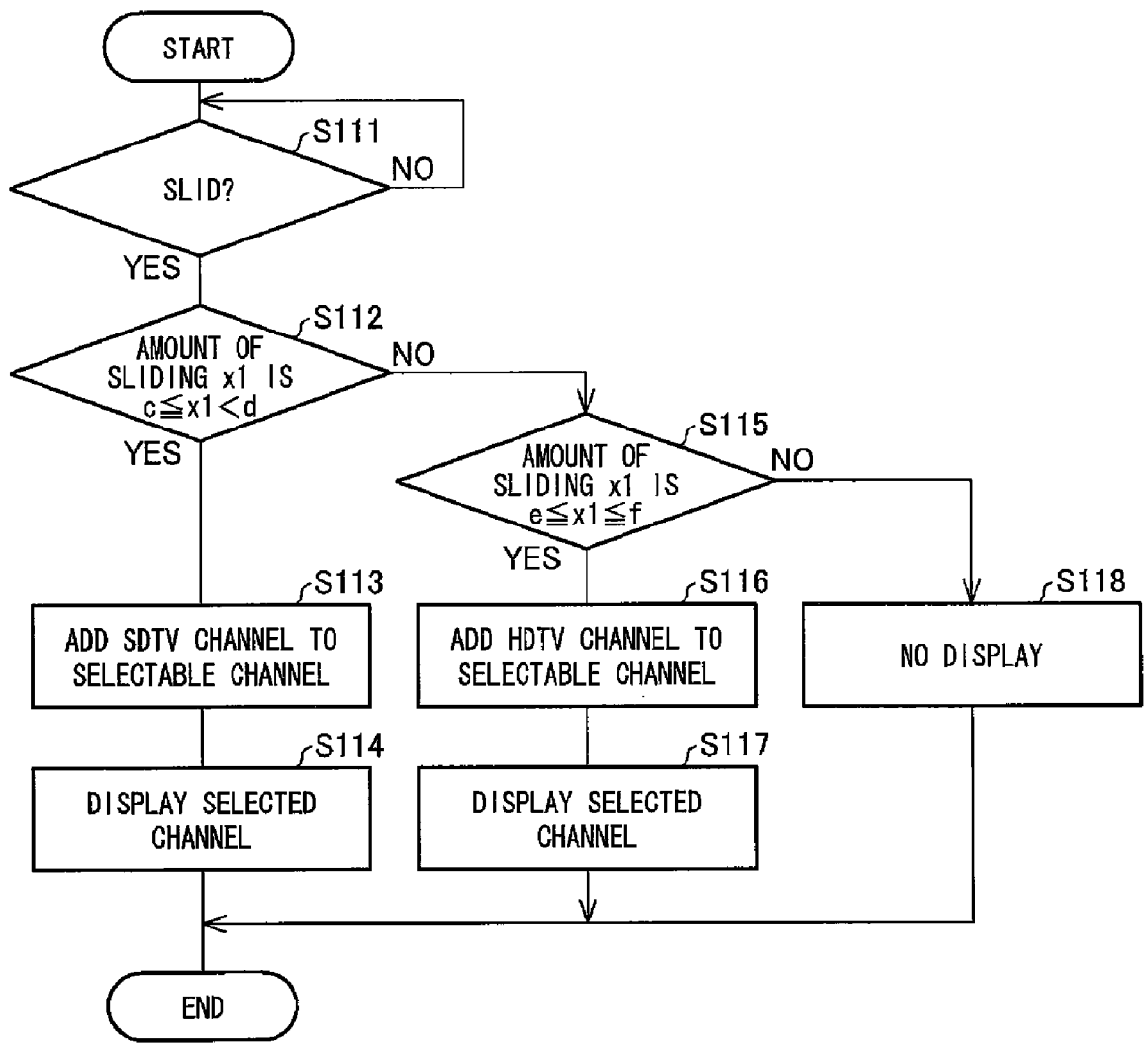
Figure 12:
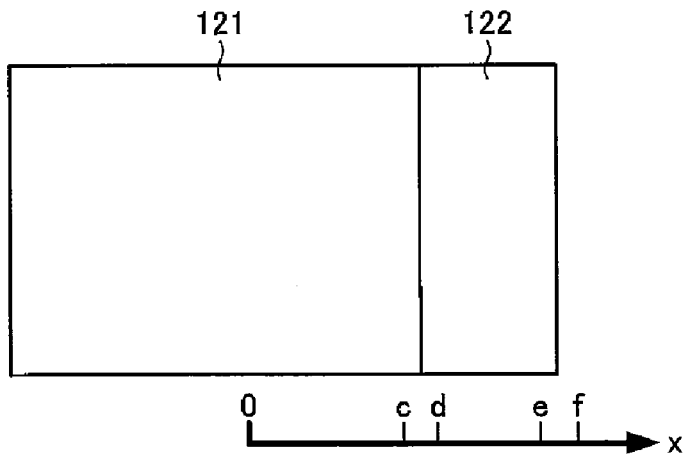

FIG. 11 is a flowchart showing a flow in a process in which the mobile terminal unit 1 changes selectable channels in a manner responsive to the amount of sliding of the flexible LCD 2. FIG. 12 is a figure showing a relationship between the amount of sliding of the flexible LCD 2 and the selectable channels.

As shown in FIG. 11, first, the amount-of-sliding detecting section 4 determines whether the flexible LCD 2 is pulled out from the upper cabinet 20 (step S111). If a result of this determination is "TRUE" (Yes), then the amount-of-sliding detecting section 4 measures the amount of sliding of the flexible LCD 2, and outputs this amount to the display change determining section 11. The display change determining section 11 determines whether the amount of sliding x1 of the flexible LCD 2 satisfies $c \leq x1 < d$.

Those "c" and "d" are reference amounts of sliding, as indicated in FIG. 12, and are stored in advance in the memory 10 in the mobile terminal unit 1. The reference amounts of sliding indicate a range in which the ratio of the width to the length of the revealed part of the flexible LCD 2 is approximately 4 to 3.

If it is determined in step S112 that the amount of sliding x1 satisfies $c \leq x1 \leq d$, then the display change determining section 11 determines that only channels of Standard Definition Television (hereinafter, "SDTV") are displayable on the flexible LCD 2 (step S113). In other words, the display change determining section 11 deletes channels of High Definition Television (hereinafter, "HDTV")) from the list of selectable channels. This allows the user to select only the channels of SDTV. At this time, the display controller 3 causes the flexible LCD 2 to display programs on a channel selected by the user (step S114).

On the other hand, in FIG. 12, if it is not determined that the amount of sliding x1 satisfies $c \leq x1 \leq d$ (No), the display change determining section 11 then determines whether the amount of sliding x1 satisfies $e \leq x1 \leq f$. Those "e" and "f" are reference amounts of sliding, as indicated in FIG. 12, and are stored in advance in the memory 10 in the mobile terminal unit 1. The reference amounts of sliding of the flexible LCD 2 indicate a range in which the ratio of the width to the length of the revealed part of the flexible LCD 2 is approximately 16 to 9.

If it is determined in step S115 that the amount of sliding x1 satisfies e≦x1≦f (Yes), then the display change determining section 11 determines that only the channels of HDTV are selectable (step S116). In other words, the display change determining section 11 deletes the channels of SDTV from the list of selectable channels. This allows the user to select only the channels of HDTV. At this time, the display controller 3 causes the flexible LCD 2 to display programs on a channel selected by the user (step S117).

On the other hand, in FIG. 11, if it is determined that the amount of sliding x1 does not satisfy e≦x1≦f, then the display change determining section 11 determines that a program on the channel received is not going to be displayed on the flexible LCD 2. Thus, the display controller 3 causes the flexible LCD 2 to display nothing (step S118). At the same time, the display controller 3 notifies the user that the pullout amount of the flexible LCD 2 is not suitable to display the channel. At this time, instead of causing the flexible LCD 2 to display nothing, the display controller 3 may cause the flexible LCD 2 to display a message notifying that the current size of the flexible LCD 2 is not suitable to display the broadcast program.

In the mobile terminal unit 1, a most suitable application (e.g. television, camera, image reproduction, the Internet, navigation) responsive to the pullout amount of the flexible LCD 2 is activated. In this case, although not illustrated, an application activating section is provided to the mobile terminal unit 1. The application activating section compares the amount of sliding of the flexible LCD 2, which amount is measured by the amount-of-sliding detecting section 4, with the reference amounts of sliding (this is stored in the memory 10) that are respectively associated with the applications. At this time, if determining that the amount of sliding thus measured is within the range of the reference amount of sliding, the application activating section activates a predetermined application associated in advance with the range. Thus, the application that suitably displays in a manner responsive to a current size of the flexible LCD 2 is activated in the mobile terminal unit 1.

The application activating section may cause the application when a certain period of time (for example one second) has passed since the amount of sliding of the flexible LCD 2 stops changing. This makes it possible to avoid a problem that, for example, while the program of HDTV is being watched, SDTV is activated when the amount of sliding comes between c and d so that an additional process becomes necessary.

In a case in which a plurality of applications are associated with one range of the reference amounts of sliding, the application activating section may display a menu of a list of applications that can be activated, when the amount of sliding of the flexible LCD 2 reaches the reference amount of sliding, thereby allowing the user to select a desired application to be activated. This prevents waste of memory due to simultaneous activation of plural applications.

Embodiment 2

The following describes Embodiment 2 of the present invention, with reference to FIGS. 13 to 16.

FIG. 13 is a block diagram showing a configuration of main sections of a mobile terminal unit 1a in accordance with Embodiment 2 of the present invention. The mobile terminal unit 1a of the present embodiment further includes, in addition to a winding flexible LCD 2, a motor 131 to automatically, instead of manually, pull out and retract the flexible LCD 2. Specifically, the mobile terminal unit 1a includes the flexible LCD 2, a main-display backlight 5 for a main display, a sub-display backlight 6 for a sub-display, a controller 12a, a motor 131, an operational section 133, and an antenna 135, as shown in FIG. 13.

Those components except for the controller 12a are realized in the form of hardware devices. The controller 12a, on the other hand, is realizable with software as well as hardware logic. The controller 12a includes a display controller 3, a light controller 7, a motor controller 132, an operation accepting section 134, a broadcast receiver 136, and a channel determining section 137, as shown in FIG. 1.

Figure 14:
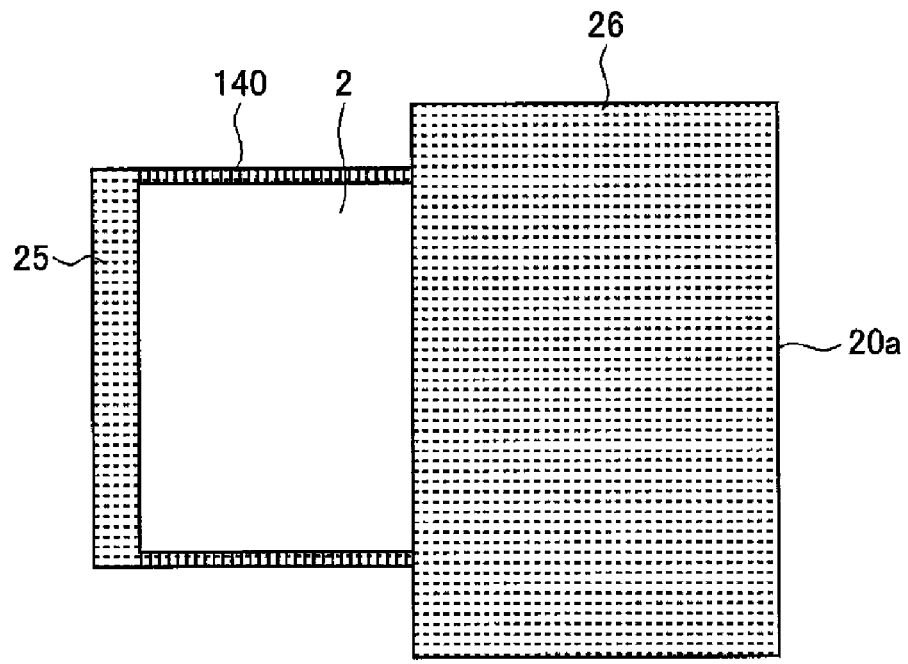
Figure 15:
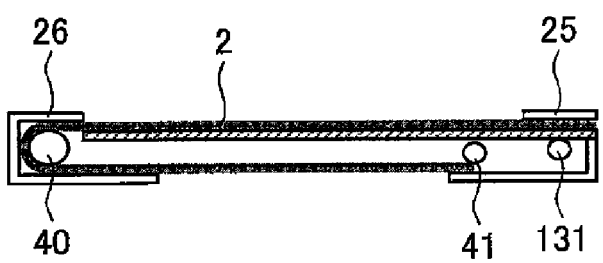
Figure 15:
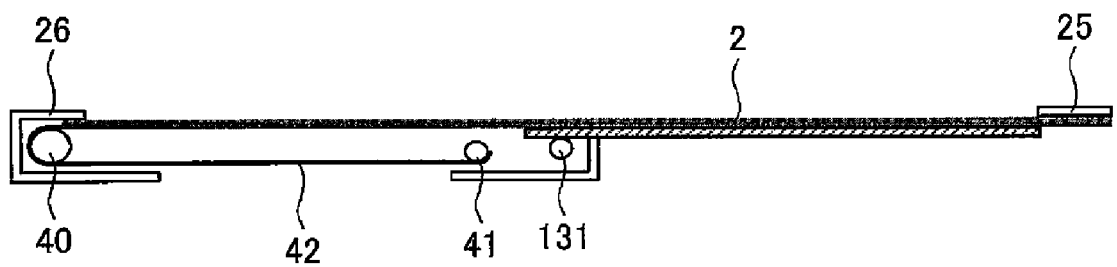

FIG. 14 is a plan view of an upper cabinet 20a of the mobile terminal unit 1a, which upper cabinet 20a is viewed from a back side. In the upper cabinet 20a shown in this figure, a gear 140 is provided at a part of the back side of the flexible LCD 2, which part corresponds to the supporting section 27. FIGS. 15(a) and 15(b) are figures each showing a sectional view of the upper cabinet 20a. FIG. 15(a) is a figure showing a state in which the flexible LCD 2 is housed completely in the upper cabinet 20a. FIG. 15(b) is a figure showing a state in which the flexible LCD 2 is pulled out completely from the upper cabinet 20a. A shaft of the motor 131 is equipped with the gear. In the mobile terminal unit 1a, when the motor controller 132 causes the motor 131 to rotate, a certain driving force is transmitted to the flexible LCD 2 via the gear 140 engaged with the gear of the motor 131. If the driving force is transmitted in a positive direction, the flexible LCD 2 is automatically pulled out from the upper cabinet 20a as shown in FIG. 15(b). If the driving force is transmitted in a negative direction, the flexible LCD 2 is automatically retracted into the upper cabinet 20a.

(Changing the Size in a Manner Responsive to a Selected Channel)

In the mobile terminal unit 1a, the flexible LCD 2 is automatically slid so that the size of the flexible LCD 2 is changed to a suitable size for the channel selected by the user. The following describes a flow in a process carried out at this time, with reference to FIG. 16.

Figure 16:
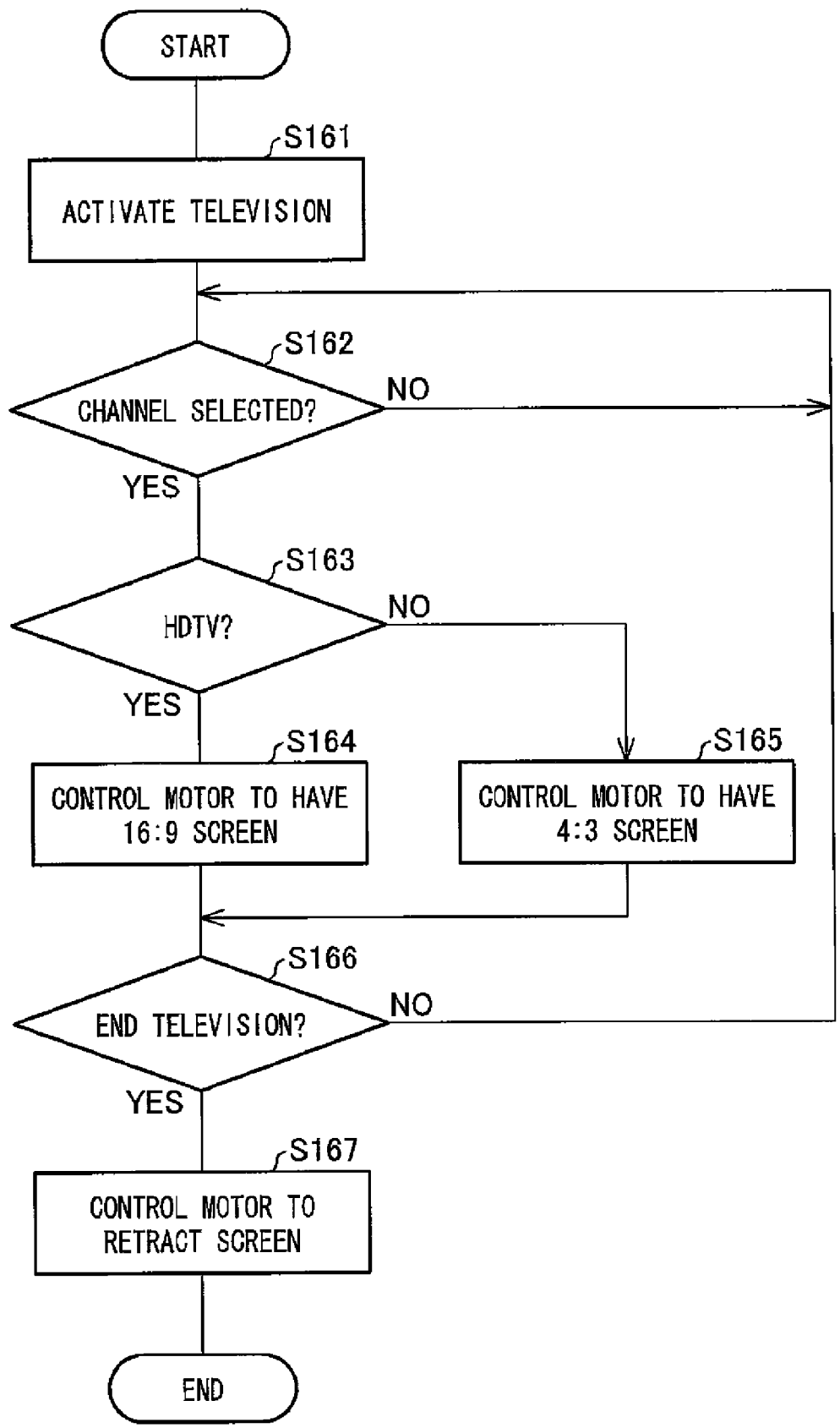

FIG. 16 is a flowchart showing the flow in the process in which the mobile terminal unit 1a automatically slides the flexible LCD 2 so that the size of the flexible LCD 2 is changed to the suitable size for the channel selected by the user.

The user enters an operation to activate the television via the operational section 133. The operation accepting section 134 accepts this operation so that the television is activated in the mobile terminal unit 1a (step S161). Then, the operation accepting section 134 determines whether a channel is selected by the user via the operational section 133 (step S162).

If the operation accepting section 134 determines that a channel is selected by the user (Yes), then the broadcast receiver 136 receives a program on the channel selected by the user, and outputs the program to the channel determining section 137. The channel determining section 137 determines characteristics of the channel selected by the user. Specifically, the channel determining section 137 determines whether the channel is HDTV (step S163).

If the channel determining section 137 determines in step S163 that the channel is HDTV (Yes), then the motor controller 132 controls the motor 131 so that the ratio of the width to the length of a revealed part of the flexible LCD 2 becomes 16 to 9. Thus, the flexible LCD 2 moves automatically, and the ratio of the width to the length of the revealed part is changed to 16 to 9. Accordingly, the size of the flexible LCD 2 becomes suitable for HDTV.

On the other hand, if determining in step S163 that the channel is not HDTV, then the channel determining section 137 determines that the channel is SDTV. Then, the motor controller 132 controls the motor 131 so that the ratio of the width to the length of the revealed part of the flexible LCD 2 becomes 4 to 3. Thus, the flexible LCD 2 moves automatically, and the ratio of the width to the length of the revealed part is changed to 4 to 3. Accordingly, the size of the flexible LCD 2 becomes suitable for SDTV.

After the motor controller 132 controls the motor 131, the operation accepting section 134 determines whether the user carries out, via the operational section 133, an operation to end the television (step S166). If a result of this determination is "TRUE" (Yes), then the motor controller 132 controls the motor 131 so that the flexible LCD 2 is retracted completely into the upper cabinet 20*a* (step S167).

If the mobile terminal unit 1 receives an incoming call when the flexible LCD 2 is being pulled out, the motor controller 132 controls the motor 131 so that the flexible LCD 2 is retracted completely into the upper cabinet 20*a*. Thus, the user is not bothered by the flexible LCD 2 when talking on the phone.

If the mobile terminal unit 1 receives an incoming call when the flexible LCD 2 is being pulled out, the controller 12*a* prompts the user as to whether the flexible LCD 2 should be retracted. Specifically, the display controller 3 causes the flexible LCD 2 to display a message to prompt.

If the mobile terminal unit 1 receives an incoming call when the flexible LCD 2 is being pulled out, the mobile terminal unit 1*a* automatically allows hands-free talking.

If the mobile terminal unit 1 receives an incoming call when the flexible LCD 2 is being pulled out, the mobile terminal unit 1 automatically receives the incoming call to be ready for talking if the user manually retracts the flexible LCD 2 into the upper cabinet 20*a*. Thus, the user does not have to carry out an operation to receive the incoming call.

Embodiment 3

The following describes Embodiment 3 of the present invention, with reference to FIGS. 17 to 20.

Figure 17:
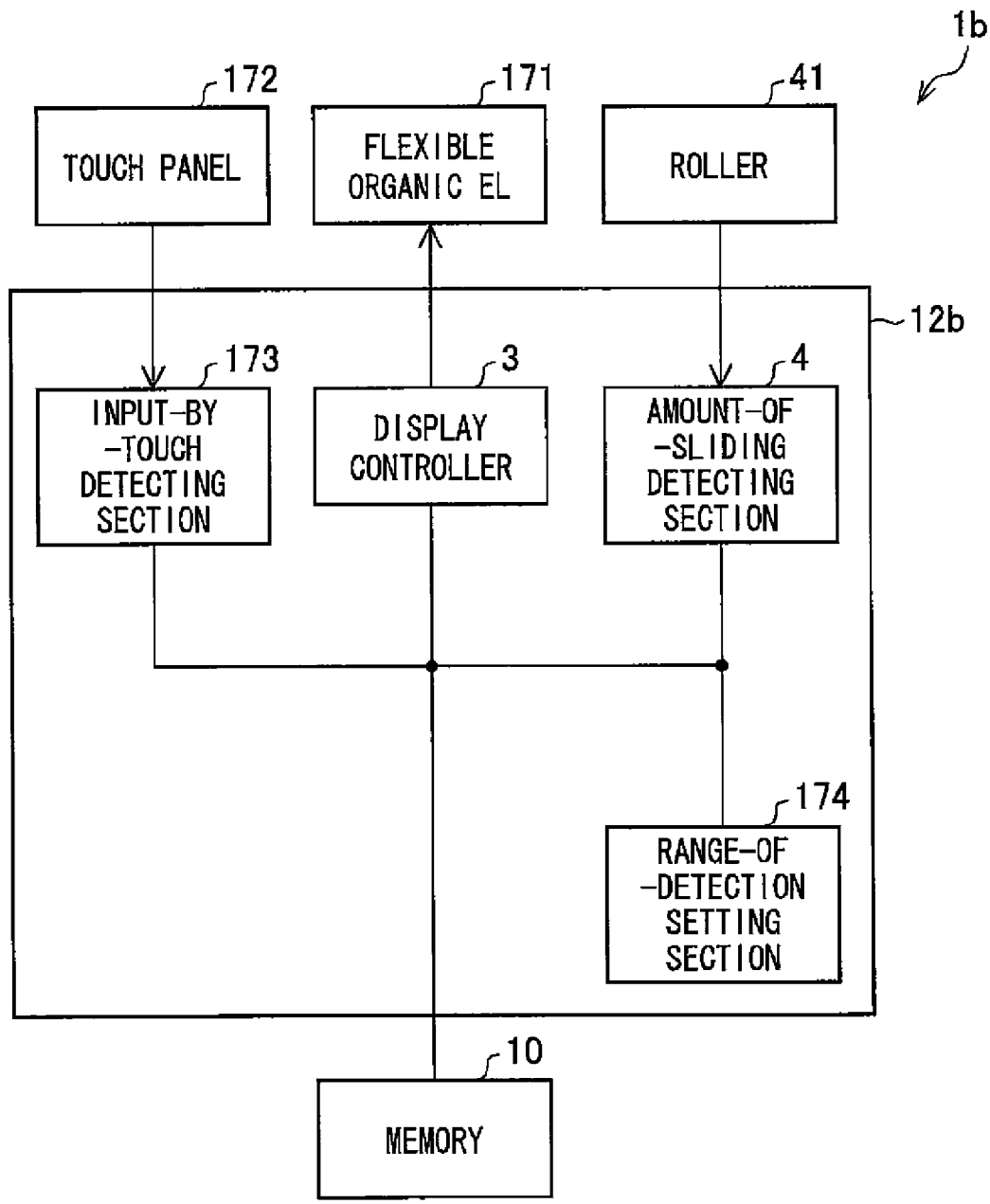

FIG. 17 is a block diagram showing a configuration of main sections of a mobile terminal unit 1*b* in accordance with Embodiment 3 of the present invention. As shown in this figure, the mobile terminal unit 1*b* includes a memory 10, a controller 12*b*, a roller 41, a flexible organic EL 171 (pullout display), and a touch panel 172 (touched-section detecting member). Those components except for the controller 12*b* are realized in the form of hardware devices. The controller 12*b*, on the other hand, is realizable with software as well as hardware logic. The controller 12*b* includes a display controller 3, an amount-of-sliding detecting section 4, an input-by-touch detecting section 173, and a range-of-detection setting section 174, as shown in FIG. 17.

(Overview of the Mobile Terminal Unit 1*b*)

In the mobile terminal unit 1*b*, the flexible organic EL 171 functions as a display panel (display) to display various information such as texts and images. The flexible organic EL 171 is a flexible display that can be freely pulled out from the upper cabinet 20*b* shown in FIG. 18.

The term "flexibility" here is interpreted in broad meanings. Specifically, the flexible organic EL 171 with flexibility is realizable by an organic EL display constituted of one substrate serving as a base and having a property of bendability. The flexible organic EL 171 is also realizable by a shutter-shaped organic EL display constituted of strips of thin organic EL panels that are coupled. Each coupling section between the strips of organic EL panels bends, whereby the flexible organic EL 171 as a whole has the property of bendability.

In the mobile terminal unit 1*b*, the upper cabinet 20*b* includes no backlight. This is because the flexible organic EL 171 is a display panel having a self-emitting organic EL device and therefore does not need a backlight.

The mobile terminal unit 1*b* may include a reflective LCD as a display that needs no backlight. The mobile terminal unit 1*b* may include a transflective LCD using both reflection of outside light and a backlight as light sources. In this case, the backlight is turned off to use the LCD being pulled out from the upper cabinet 20*b* as a reflective LCD. Thus, there is no difference in brightness between a part of the LCD that is outside of the upper cabinet 20*b* and a part of the LCD that has the backlight. The backlight may be in the shape of a flexible sheet, and may be combined with the flexible LCD to be pulled out along with the flexible LCD.

FIGS. 18(*a*) and 18(*b*) each show a sectional view of the upper cabinet 20*b*. Specifically, FIG. 18(*a*) is a figure showing a state in which the flexible organic EL 171 is housed completely in the upper cabinet 20*b*, and FIG. 18(*b*) is a figure showing a state in which the flexible organic EL 171 is pulled out completely from the upper cabinet 20*b*. As shown in FIG. 18(*a*), the flexible organic EL 171 is a flexible display panel. Thus, in the same manner as the flexible LCD 2 discussed above, the flexible organic EL 171 may be wound around the upper cabinet 20*b* of the mobile terminal unit 1*b* so as to be retracted into the upper cabinet 20*b*. As shown in FIG. 18(*b*), it is possible to pull out the flexible organic EL 171 from the upper cabinet 20*b*.

A pullout section 25 is provided at one end of the flexible organic EL 171 as shown in FIG. 18(*a*). The user holds the pullout section 25 to pull the flexible organic EL 171 so that the flexible organic EL 171 is pulled out from the upper cabinet 20*b*. A sheet 42, which is windable, is provided at the other end of the flexible organic EL 171. In the state shown in FIG. 18(*a*), the sheet 42 is wound completely around the roller 41. When the flexible organic EL 171 is pulled out, the sheet 42 is stretched to change from a wound state to an extended state. At this time, the flexible organic EL 171 is slid while being in contact with the roller 40 so as to be changed from a state in which the flexible organic EL 171 is bent to a state in which the flexible organic EL 171 is stretched straight, as shown in FIG. 18(*b*).

The amount-of-sliding detecting section 4 measures the amount of rotation of the roller 41 to measure the amount of sliding (pullout amount) of the flexible organic EL 171. It should be noted that the method by which the amount-of-sliding detecting section 4 measures the amount of sliding of the flexible organic EL 171 is not limited to the foregoing method.

The upper cabinet 20*b* of the mobile terminal unit 1*b* is equipped with the touch panel 172, which overlaps the flexible organic EL 171. The touch panel 172 is hardware to accept a particular user operation by detecting, when the user touches an object shown on a screen, this touch. At a part being pulled out from the upper cabinet 20*b*, the touch panel 172 is unstable and therefore is difficult to press. Thus, the touch panel 172 is rigidly mounted on a substrate in the upper cabinet 20*b* so that, when the flexible organic EL 171 is pulled out from the upper cabinet 20*b*, the touch panel 172 does not move along with the flexible organic EL 171. In the mobile terminal unit 1*b*, the touch panel 172 remains in the upper cabinet 20*b* so that, even after the flexible organic EL 171 is pulled out from the upper cabinet 20*b*, ease of use of the touch panel 172 is maintained.

(Process of Changing a Touch Detection Area)

The mobile terminal unit 1*b* flexibly changes the touch detection area on the touch panel 172 in a manner responsive to a position to which the flexible organic EL 171 is slid. The following describes a flow in a process carried out at this time, with reference to FIGS. 19 and 20.

Figure 20:
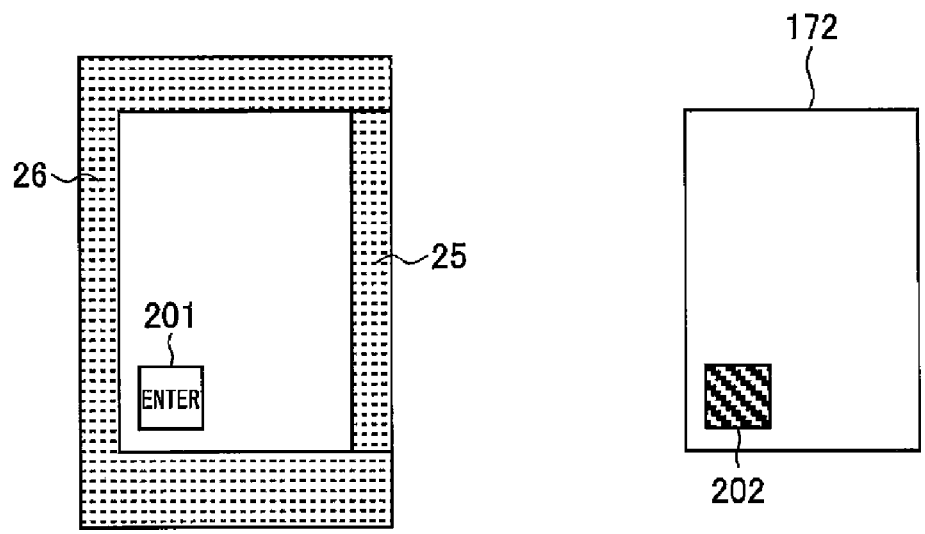
Figure 20:
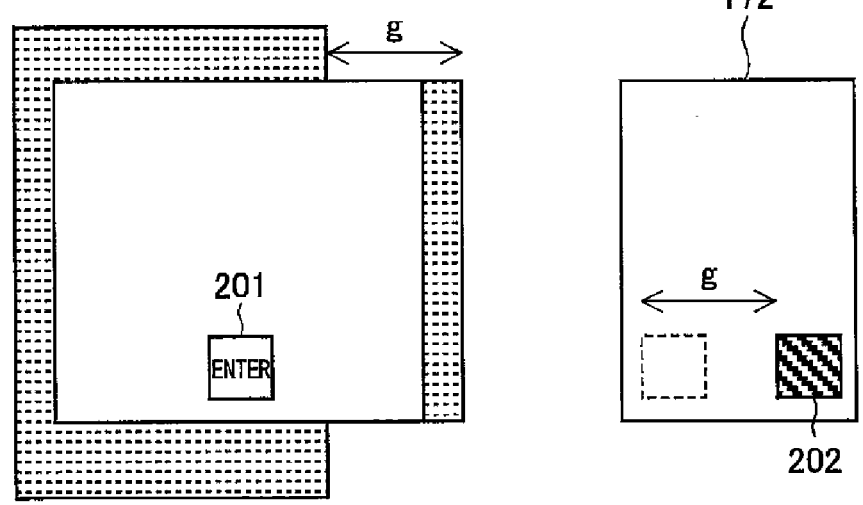
Figure 20:
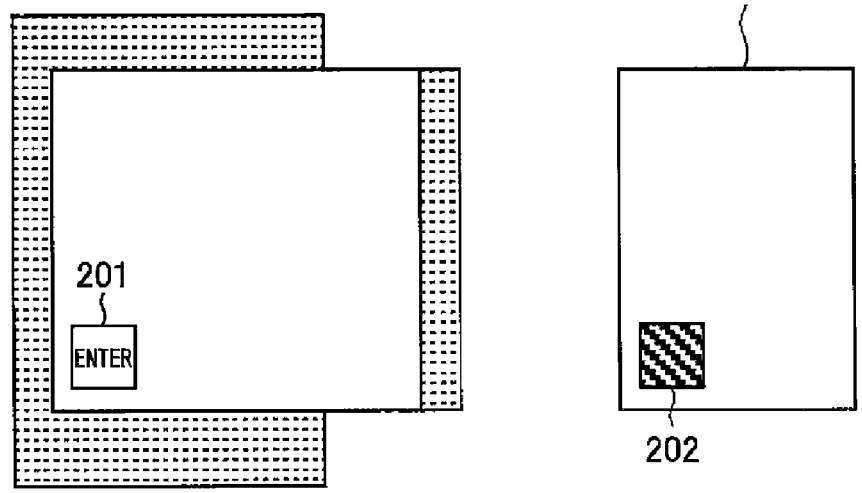

FIG. 19 is a flowchart showing the flow in the process in which, when the flexible organic EL 171 is slid, the touch detection section of the touch panel 172 is changed along with this sliding. FIGS. 20(*a*) to 20(*c*) are figures each showing a relationship between the position to which the flexible organic EL 171 is slid and the touch detection area. Specifically, FIG. 20(*a*) is a figure showing an exemplary display of the flexible organic EL 171 and a relationship between the exemplary display and the touch detection area on the touch panel 172, at the time when the flexible organic EL 171 is housed completely in the upper cabinet 20*b*. FIG. 20(*b*) is a figure showing an exemplary display of the flexible organic EL 171 and a relationship between the exemplary display and the touch detection area on the touch panel 172, at the time when the flexible organic EL 171 is pulled out from the upper cabinet 20*b*. FIG. 20(*c*) is a figure showing an exemplary display of the flexible organic EL 171 and a different relationship between the exemplary display and the touch detection area on the touch panel 172, at the time when the flexible organic EL 171 is pulled out from the upper cabinet 20*b*.

In the state shown in FIG. 20(*a*), the flexible organic EL 171 is housed completely in the upper cabinet 20*b*. At this time, the display controller 3 causes an enter button 201 in a lower left area of a revealed part of the flexible organic EL 171. When the user presses a display position of the enter button 201 on the touch panel 172, a input-by-touch detecting section 173 detects this pressing. Detecting the pressing, the input-by-touch detecting section 173 determines that the user presses the enter button. Thus, the mobile terminal unit 1*b* carries out a predetermined process associated with the pressing.

In the mobile terminal unit 1*b*, the amount-of-sliding detecting section 4 determines whether the flexible organic EL 171 is slid (step S191). If a result of this determination is "TRUE" (Yes), then the display controller 3 adjusts a range of display in a manner responsive to the amount of sliding of the flexible organic EL 171, as described above (step S192). When the user pulls out the flexible organic EL 171 so that the state of the flexible organic EL 171 changes from that shown in FIG. 20(*a*) to that shown in FIG. 20(*b*), the flexible organic EL 171 is shifted by distance g, which is indicated in FIG. 20(*b*). The display controller 3 then increases the range of display of the flexible organic EL 171 by distance g. By this way, for example the enter button 201 is displayed at the center of the revealed part of the flexible organic EL 171.

Then, the range-of-detection setting section 174 moves the touch detection section in a manner responsive to the amount of sliding of the flexible organic EL 171. Specifically, a value indicating a current touch detection area, which is stored in the memory 10, is shifted by the amount of sliding of the flexible organic EL 171 so that the value is changed to a value in a range shifted by the amount of sliding. In the case shown in FIG. 20(*b*), the display position of the enter button 201 is shifted to the right by distance g on the flexible organic EL 171. In response to this shift, the range-of-detection setting section 174 changes a value of the touch detection area to a value shifted rightward by distance g. By this way, the touch detection area on the touch panel 172 is moved (step S193).

Note that even if the flexible organic EL 171 is pulled out, the display controller 3 does not have to change what is displayed on the flexible organic EL 171. In the case shown in FIG. 20(*c*), the flexible organic EL 171 is pulled out by distance g, but the display controller 3 does not change the display position of the enter button 201. At this time, as the position of the enter button 201 is not changed, the range-of-detection setting section 174 does not change the value of the touch detection area to leave the value. Specifically, the range-of-detection setting section 174 does not change at all the value of the touch detection area that is stored in the memory 10.

The present invention is not limited to the description of the embodiments above, but may be altered by a skilled person within the scope of the claims. An embodiment based on a proper combination of technical means disclosed in different embodiments is encompassed in the technical scope of the present invention.

For example, a display that can be included in the mobile terminal unit 1 and can be pulled out may be a display constituted of one display panel such as the flexible LCD 2, or a display constituted of thin and long display panels that are coupled. The display constituted of one display panel has no junction when extended, and therefore is easy to see and preferable. The same applies to the flexible organic EL 171.

Further, the flexible LCD 2 may be a display that needs light emitted from the back, such as a liquid crystal display. In this case, to display information on the flexible LCD 2, the mobile terminal unit 1 may further include a backlight to apply light from the back of the flexible LCD 2.

The backlight may be arranged so that it can be pulled out along with the flexible LCD 2. In this case, when the user pulls out the flexible LCD 2, the backlight is also pulled out at the same time. Thus, the backlight being pulled out at the same time applies light to the part of the flexible LCD 2 that is being pulled out.

In this case, to display information, the mobile terminal unit 1 applies light evenly to the flexible LCD 2 being pulled out. Thus, brightness of display on the screen of the flexible LCD 2 is stabilized uniformly, without carrying out a particular process. In other words, the flexible LCD 2 does not become extremely dark or bright partially.

The mobile terminal unit 1 may includes a sound output member (e.g. speaker) to output sound. The sound output member may or may not be pulled out along with the flexible LCD 2. If the sound output member is to be pulled out along with the flexible LCD 2, when the user pulls out the flexible LCD 2, the sound output member is also pulled out concurrently and moves to a position away from the body of the mobile terminal unit 1.

Thus, the mobile terminal unit 1 further improves the sense of realism of audio output when the flexible LCD 2 is being pulled out. This effect is significant for example when one of the stereo speakers is pulled out along with the flexible LCD 2 while the other one of the stereo speakers remains in the body.

Further, the sound output member may be a speaker transducer provided to the flexible LCD 2. In this case, the speaker transducer is integral with a part of the flexible LCD 2. Thus, the flexible LCD 2 functions as a display integral with speakers.

Figure 21:
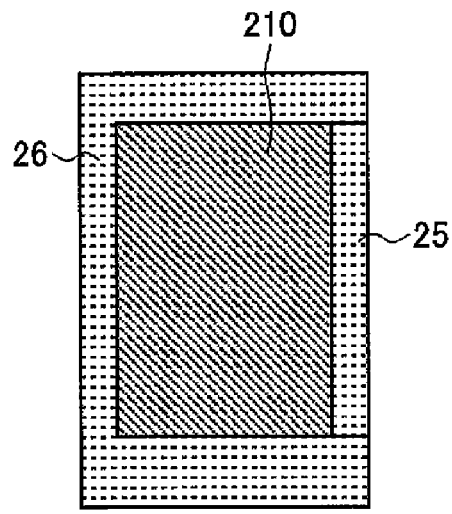
Figure 21:
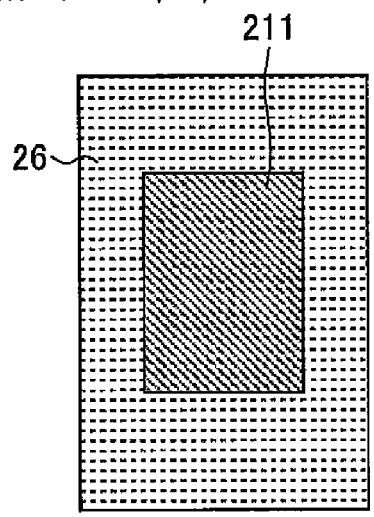
Figure 21:
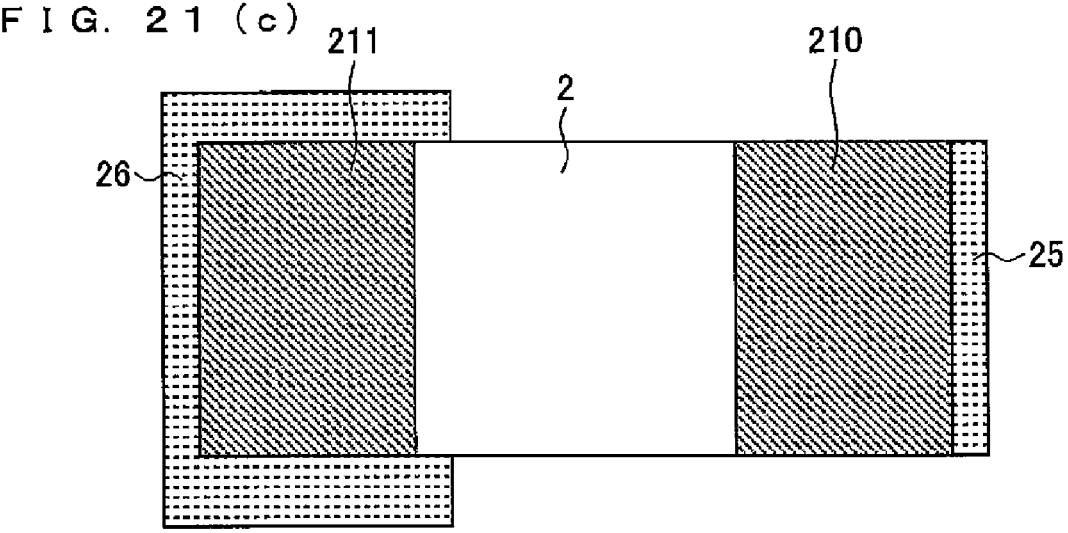

The following describes the speaker transducer provided to the flexible LCD 2, with reference to FIGS. 21(*a*) to 21(*c*). FIGS. 21(*a*) to 21(*c*) are figures showing the speaker transducer provided to the flexible LCD 2. Specifically, FIG. 21(*a*) is a figure showing how a first speaker transducer 210 is provided at a part of the flexible LCD 2 that corresponds to the main display 23. FIG. 21(b) is a figure showing how a second speaker transducer 211 is provided at a part of the flexible LCD 2 that corresponds to the sub-display 22. FIG. 21(c) is a figure showing how the first speaker transducer 210 and the second speaker transducer 211 form the stereo speakers when the flexible LCD 2 is pulled out completely.

It is preferable that the first speaker transducer 210 be provided at the part of the flexible LCD 2 that corresponds to the main display 23 as shown in FIG. 21(a), and that the second speaker transducer 211 be provided at the part of the flexible LCD 2 that corresponds to the sub-display 22 as shown in FIG. 21(b). In this configuration, when the flexible LCD 2 is inserted completely in the upper cabinet 20 of the mobile terminal unit 1, the first speaker transducer 210 outputs monophonic sound related to information to be displayed on the main display 23. On the other hand, the second speaker transducer 211 outputs monophonic sound related to information to be displayed on the sub-display 22.

When the user pulls out the flexible LCD 2 in this configuration, the flexible LCD 2 being bent becomes straight to form one large display area. In the display area, the first speaker transducer 210 and the second speaker transducer 211 are provided at both ends, respectively, as shown in FIG. 21(c). The first speaker transducer 210 and the second speaker transducer 211 form stereo speakers.

Sound outputting means provided to the mobile terminal unit 1 outputs signals of stereo sound of one of the channels to the first speaker transducer 210 while outputting signals of stereo sound of the other one of the channels to the second speaker transducer 211. Thus, for example when the flexible LCD 2 is pulled out so that a display area at the ratio of 16 to 9 is revealed, the sound outputting means outputs the signals of stereo sound to the first speaker transducer 210 and to the second speaker transducer 211. Thus, the size of the display area on the flexible LCD 2 increases, and at the same time, the monophonic sound is switched to stereo sound. Therefore, impact of display improves, and at the same time, impact and the sense of reality of sound also improve, when the mobile terminal unit 1 reproduces contents such as movies.

It is preferable in the mobile terminal unit 1 that, if the pullout amount of the flexible LCD 2 decreases when the display controller 3 causes information to be displayed on the flexible LCD 2 being pulled out from the upper cabinet 20, the display controller 3 cause the information being displayed to move, in the direction in which the flexible LCD 2 is to be pulled out, by a distance substantially equal to the pullout amount thus decreased.

In this case, when the flexible LCD 2 is moved in the direction in which the flexible LCD 2 is retracted into the upper cabinet 20, the information displayed on the flexible LCD 2 is shifted by the distance that the flexible LCD 2 is moved. Therefore, when the user retracts the flexible LCD 2 into the upper cabinet 20, the display position of the information that the user is browsing does not change relatively before and after that retraction.

This allows the user to see the information shown on the flexible LCD 2 more comfortably. Further, when the user pulls out the flexible LCD 2 from the mobile terminal unit 1 and retracts the flexible LCD 2 into the mobile terminal unit 1 repeatedly, the display controller 3 can update the display on the flexible LCD 2 one after another in the manner of scrolling pages.

It is preferable in the mobile terminal unit 1 that, if the pullout amount of the flexible LCD 2 is increased when the display controller 3 causes information to be displayed on the flexible LCD 2 being pulled out from the upper cabinet 20, the display controller 3 cause the information being displayed to be moved, in the direction in which the flexible LCD 2 is retracted into the upper cabinet 20, by a distance substantially equal to the pullout amount thus increased.

In this case, when the flexible LCD 2 is moved in the direction in which the flexible LCD 2 is to be pulled out from the upper cabinet 20, the information displayed on the flexible LCD 2 is shifted by the distance the flexible LCD 2 is moved. Thus, when the user pulls out the flexible LCD 2 from the upper cabinet 20, the display position of the information that the user is browsing does not change relatively before and after the flexible LCD 2 is pulled out from the upper cabinet 20.

This allows the user to see the information on the flexible LCD 2 more comfortably. Further, when the user pulls out the flexible LCD 2 from the mobile terminal unit 1 and retracts the flexible LCD 2 into the mobile terminal unit 1 repeatedly, the display controller 3 can update the display on the flexible LCD 2 one after another in the manner of scrolling back the pages.

The mobile terminal unit 1 performs at least one of the shifting processes described above: shifting the display at the time when the pullout amount is decreased; and shifting the display at the time when the pullout amount is increased. Note that combination of those two shifting processes makes it possible that displayed information does not change at all relatively when the flexible LCD 2 is pulled out and retracted into repeatedly.

At least a part of one of surfaces that are separated at a bent section when the flexible LCD 2 is bent to be housed in the upper cabinet 20 is revealed on an external surface of the upper cabinet 20 to function as the main display 23. Further, at least a part of the other surfaces that are separated at the bent section is revealed, to function as the sub-display 22 different from the main display 23, on a surface different from the external surface on which the main display 23 is revealed.

In this case, the flexible LCD 2 functions as the main display 23 and the sub-display 22 in the mobile terminal unit 1. One flexible LCD 2 is used as both the main display 23, which is on a surface of the mobile terminal unit 1, and the sub-display 22, which is on another surface at a back of the surface. By this way, the mobile terminal unit 1 utilizes the flexible LCD 2 more efficiently.

Figure 22:
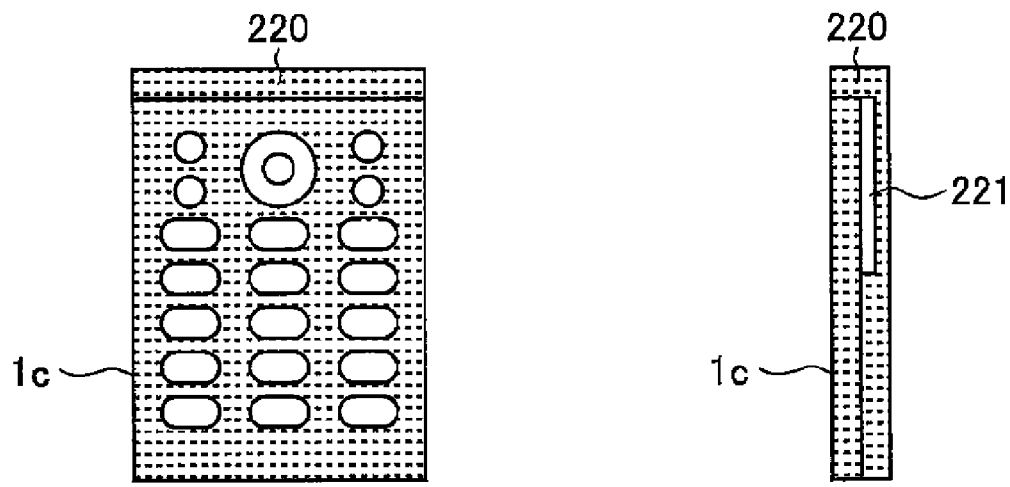
Figure 22:
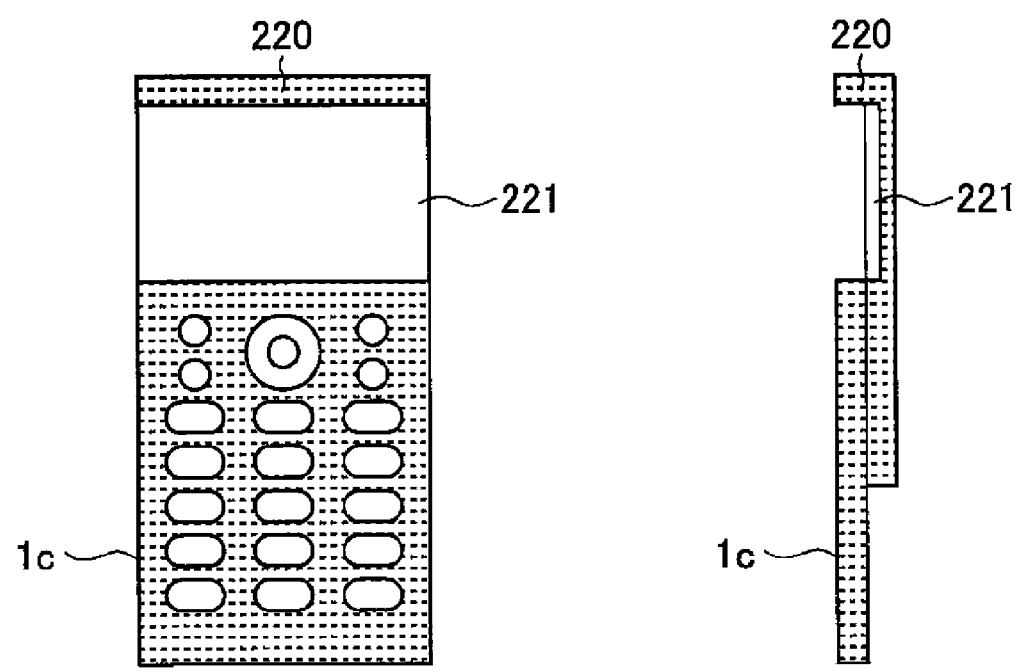

The present invention is also realizable by a mobile terminal unit 1c including a sliding section 220 equipped with a display 221, as shown in FIGS. 22(a) and 22(b). FIG. 22(a) is a figure showing the mobile terminal unit 1c in which the sliding section 220 is not slid. FIG. 22(b) is a figure showing the mobile terminal unit 1c in which the sliding section 220 is being slid.

As shown in FIG. 22(a), the mobile terminal unit 1c includes the sliding section 220. The sliding section 220 is equipped with the display 221. When the sliding section 220 is not slid, the display 221 is housed completely in the mobile terminal unit 1c. Thus, the display 221 is not revealed outside of the mobile terminal unit 1c.

If the user slides the sliding section 220 as shown in FIG. 22(b), the display 221 is also slid. Consequently, the display 221 is revealed outside of the mobile terminal unit 1c. This allows the user to see display of information via the display 221.

Figure 23:
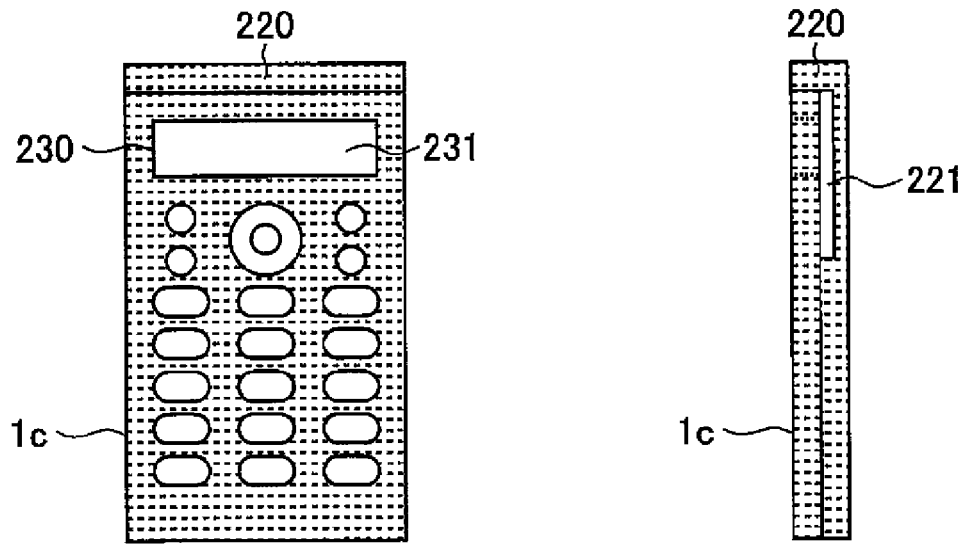
Figure 23:
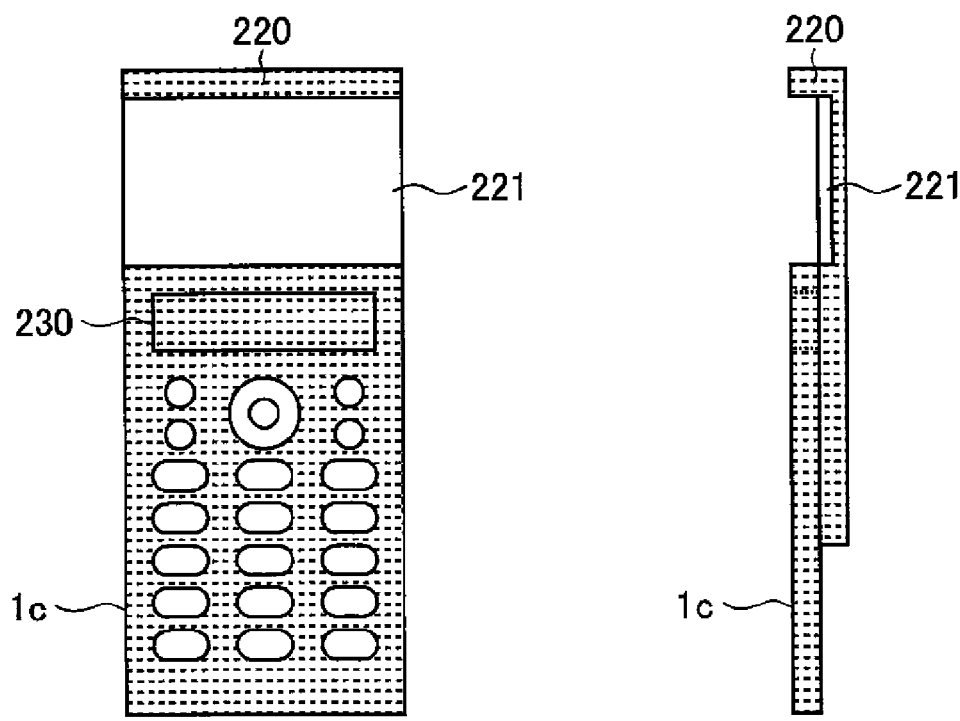

The mobile terminal unit 1c is realizable by a configuration in which a part of the display 221 functions as the sub-display 231 as shown in FIGS. 23(a) and 23(b). FIG. 23(a) is a figure showing the mobile terminal unit 1c in which the part of the display 221 functions as the sub-display 231 when the sliding section 220 is not slid. FIG. 23(b) is a figure showing the mobile terminal unit 1c in which the sub-display 231 does not function when the sliding section 220 is being slid.

If the sliding section 220 in the mobile terminal unit 1c is not slid as shown in FIG. 23(a), a part of the display 221 is revealed outside of the mobile terminal unit 1c through the window 230. At this time, the part of the display 221 functions as the sub-display 231.

If the user slides the sliding section 220 as shown in FIG. 23(b), the display 221 is entirely revealed outside of the mobile terminal unit 1c. At this time, the housing of the sliding section 220 overlaps the window 230, so that the display 221 is not revealed through the window 230. Thus, the part of the display 221 does not function as the sub-display 231.

In the mobile terminal unit 1 of the present invention, if the flexible LCD 2 is pulled out when a television program is being displayed, the display controller 3 causes data broadcasts to be displayed on a pulled-out part of the flexible LCD 2. FIG. 24(a) is a figure showing how the television program is displayed on the flexible LCD 2 when the flexible LCD 2 is housed in the upper cabinet 20. FIG. 24(b) is a figure showing how the data broadcast is displayed on a pulled-out part of the flexible LCD 2 when the flexible LCD 2 is pulled out when the television program is being displayed.

Figure 24:
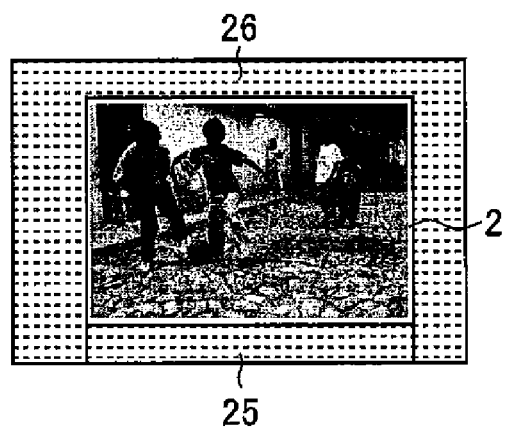
Figure 24:

In the case shown in FIG. 24, the television program is displayed on the flexible LCD 2 when the flexible LCD 2 is housed completely in the upper cabinet 20. At this time, if the user holds the pullout section 25 to pull out the flexible LCD 2 as shown in FIG. 24(b), the display controller 3 continues displaying the television program without changing the display position. At the same time, the data broadcast on the television program being displayed is displayed on a part of the flexible LCD 2, which part is being moved away from the upper cabinet 20. The display controller 3 changes the number of lines of data broadcasts to be displayed, in a manner responsive to the pullout amount of the flexible LCD 2.

It is preferable in the mobile terminal unit of the present invention that the pullout display be flexible, and the pullout display be in a state of bending when housed in the body of the mobile terminal unit.

With this configuration, the pullout display has flexibility. Thus, the pullout display is freely bendable. Utilizing this property, the pullout display is bent when housed in the body of the mobile terminal unit. This allows the pullout display to be housed in a smaller body of the mobile terminal unit, compared with a case in which the pullout display is straight when housed. This produces an advantageous effect that smaller mobile terminal units are provided.

It is preferable in the mobile terminal unit of the present invention that the display controlling means adjust a size of an image in a manner responsive to the pullout amount to display the image on the pullout display.

With this configuration, the display controlling means adjusts the size of the image displayed on the pullout display, in the manner responsive to the pullout amount. This produces an advantageous effect that the mobile terminal unit displays an image having a size responsive to the current size of the pullout display.

It is preferable in the mobile terminal unit of the present invention that the display controlling means display a content having a size responsive to the pullout amount that is detected.

With this configuration, the display controlling means selects the content having the size responsive to the current size of the pullout display, and displays the content on the pullout display. For example, an image having the same length-to-width ratio as that of the pullout display is read out from the memory to be displayed. This produces an advantageous effect that the mobile terminal unit displays the content having a most suitable size for the pullout display.

It is preferable in the mobile terminal unit of the present invention that the pullout display need light given from a back, the mobile terminal unit further comprising a backlight that emits the light to the pullout display and is allowed to be pulled out along with the pullout display.

With this configuration, the pullout display is a display that needs light given from the back, such as a liquid crystal display. To display information on the pullout display, the mobile terminal unit further includes the backlight to emit the light from the back of the pullout display. The backlight can be pulled out along with the pullout display. Therefore, when the user pulls out the pullout display, the backlight is also pulled out. Thus, the light is also given to the part of the pullout display, which part is being pulled out, by the backlight being pulled out.

Accordingly, the mobile terminal unit uniformly gives the light for displaying information to the pullout display being pulled out. This produces an advantageous effect that brightness of a display on a screen of the pullout display is stabilized uniformly without carrying out a special process. Specifically, the pullout display does not become extremely dark or bright partially.

It is preferable in the mobile terminal unit of the present invention that the pullout display need light given from a back, the mobile terminal unit further including: a backlight that emits the light to a part of the pullout display, which part is housed in the body of the mobile terminal unit; amount-of-light controlling means for controlling an amount of light to be emitted from the backlight; and amount-of-light detecting means for detecting an amount of ambient light around the mobile terminal unit, the amount-of-light controlling means controlling the amount of light to be emitted from the backlight in a manner responsive to the amount of ambient light that is detected by the amount-of-light detecting means.

With this configuration, the pullout display of the mobile terminal unit is a display that needs light given from the back, such as a liquid crystal display. To allow the pullout display to display information, the mobile terminal unit further includes the backlight to emit light from the back of the pullout display.

In the mobile terminal unit, the amount-of-light detecting means detects the amount of ambient light around the mobile terminal unit. On the basis of the amount detected, the amount-of-light controlling means controls the amount of light to be emitted from the backlight.

Thus, the same amount of light comes incident on a part of the pullout display that is housed in the body of the mobile terminal unit and on a part of the pullout display that is pulled out from the body of the mobile terminal unit. This produces an advantageous effect that brightness of a display on a screen of the pullout display is stabilized uniformly without carrying out a special process. Specifically, the pullout display does not become extremely dark or bright partially.

It is preferable that the mobile terminal unit of the present invention further include, on a front surface of the pullout display, a touched-section detecting member to detect a section touched by a user, the touched-section detecting member being rigidly mounted on the body of the mobile terminal unit.

With this configuration, the mobile terminal unit further includes, on the front surface of the pullout display, the touched-section detecting member (e.g. touch panel) to detect the section touched by the user. The touched-section detecting member is rigidly mounted on the body of the mobile terminal unit so that the touched-section detecting member is not pulled out along with the pullout display. That is to say, when the user pulls out the pullout display, the touched-section detecting member remains on the front surface of a part of the pullout display that is housed in the body of the mobile terminal unit.

For example if the pullout display is soft and has a shape that is easily bent when pulled out, the touched-section detecting member is not provided in this part. This produces an advantageous effect that detection of the touched section is prevented from being unstable.

It is preferable that the mobile terminal unit of the present invention further include, on a front surface of the pullout display, a touched-section detecting member to detect a section touched by a user, the touched-section detecting member being allowed to be pulled out along with the pullout display.

With this configuration, the mobile terminal unit further includes, on the front surface of the pullout display, the touched-section detecting member (e.g. touch panel) to detect the section touched by the user. The touched-section detecting member is not rigidly mounted on the body of the terminal unit so that the touched-section detecting member can be pulled out along with the pullout display. That is to say, when the user pulls out the pullout display, the touched-section detecting member is also pulled out to detect touching on the front surface of the part of the pullout display that is being pulled out.

This produces an advantageous effect that the mobile terminal unit detects the touching on the screen by the user even if the user touches a section of a pulled-out part of the pullout display.

It is preferable that the mobile terminal unit of the present invention further include a sound output member that is allowed to be pulled out along with the pullout display.

With this configuration, the mobile terminal unit includes the sound output member to output sound. The sound output member can be pulled out along with the pullout display. Thus, when the user pulls out the pullout display, the sound output member is also pulled out to move to a position away from the body of the mobile terminal unit.

This produces an advantageous effect that the reality of sound outputs further improves when one of the sound output members is on the side of the body of the mobile terminal unit while the pullout display is being pulled out together with the other one of the sound output members in the mobile terminal unit.

It is preferable in the mobile terminal unit of the present invention that if the pullout amount is decreased when information is being displayed, by the display means, on the pullout display pulled out from the body of the mobile terminal unit, the display means move, in a direction in which the pullout display is to be pulled out, the information by a distance substantially equal to the pullout amount that is decreased, and displays the information thus moved.

With this configuration, when the pullout display is moved in the direction in which the pullout display is to be retracted into the body of the mobile terminal unit, the information being displayed on the pullout display is shifted by the distance that the pullout display is moved. Thus, when the user retracts the pullout display into the body of the mobile terminal unit, the display position of the information that the user is browsing does not change relatively before and after the pullout display is retracted.

This produces an advantageous effect that the user can see the information shown on the pullout display more comfortably. Further, when the user pulls out the pullout display from the mobile terminal unit and retracts the pullout display into the mobile terminal unit repeatedly, the display means can update the display on the pullout display one after another in the manner of scrolling pages.

It is preferable in the mobile terminal unit of the present invention that if the pullout amount is increased, the display means move, in a direction in which the pullout display is to be retracted, information that is being displayed, by a distance substantially equal to the pullout amount that is increased, and displays the information thus moved.

With this configuration, when the pullout display is moved in the direction in which the pullout display is to be pulled out from the body of the mobile terminal unit, the information being displayed on the pullout display is shifted, in the direction in which the pullout display is to be retracted into the body of the mobile terminal unit, by the distance that the pullout display is moved. Thus, when the user pulls out the pullout display from the body of the pullout display, the display position of the information that the user is browsing does not change relatively before and after the pullout display is pulled out.

This produces an advantageous effect that the user can see the information shown on the pullout display more comfortably. Further, when the user pulls out the pullout display from the mobile terminal unit and retracts the pullout display into the mobile terminal unit repeatedly, the display means can update the display on the pullout display one after another in the manner of scrolling pack the pages.

It is preferable that the mobile terminal unit of the present invention further include application activating means for activating a predetermined application responsive to the pullout amount.

With this configuration, the application activating means activates an application responsive to the current size of the pullout display. For example, an application for showing a most suitable display on a screen for the size of the pullout display. This produces an advantageous effect that a most suitable application available to the user is activated in the mobile terminal unit.

As the foregoing describes, the mobile terminal unit of the present invention includes the display controlling means, which causes the pullout display to show a display responsive to the pullout amount detected by the amount-of-pullout detecting means. This produces an advantageous effect that a display having a display area that is extended when pulled out is utilized more efficiently.

(Program and Recording Medium)

Lastly, the blocks included in the mobile terminal unit are configured with hardware logic. It is also possible to realize the blocks with software using a CPU (Central Processing Unit) as discussed below.

Specifically, the mobile terminal unit includes the CPU, which executes commands of a control program for realizing the functions, a ROM (Read Only Memory) storing the control program, a RAM (Random Access Memory) to store the control program in an executable format, and a storage unit (recording medium), such as a memory, storing the control program and various data.

With this configuration, the object of the present invention is achievable by a predetermined recording medium.

The recording medium records program codes (execute form program, intermediate code program, source program) of the control program of the mobile terminal unit that is software to realize the functions described above, which program codes are recorded so as to be readable by a computer. The recording medium is supplied to the mobile terminal unit so that the mobile terminal unit (or CPU or MPU), which is a computer, reads the program codes recorded in the recording medium to execute the program.

The recording medium to supply the program codes to the mobile terminal unit is not limited to a particular configuration or a particular type. The recording medium may be: a tape such as a magnetic tape and a cassette tape; a disk such as an magnetic disk (e.g., floppy (registered trademark) disk, hard disk) and an optical disk (e.g., CD-ROM, MO, MD, DVD, CD-R); a card such as an IC card (including memory card) and an optical card; and a semiconductor memory such as a mask ROM, an EPROM, an EEPROM, and a flash ROM.

The object of the present invention is also realizable by configuring the mobile terminal unit so as to be connectable to a communication network. In this case, the program codes are supplied to the mobile terminal unit via the communication network. The communication network is not limited to a particular type or a particular form, as long as the communication network allows the program codes to be supplied to the mobile terminal unit. For example, the Internet, an intranet, an extranet, a LAN, an ISDN, a VAN, a CATV communication network, a virtual private network, a telephone line network, a mobile communication network, or a satellite communication network may be employed.

A transmission medium constituting the communication network is not limited to a particular configuration or a particular type, as long as the transmission medium allows the program codes to be transmitted. For example, a wire transmission medium, such as IEEE 1394, a USB, a power carrier line, a cable TV circuit, a telephone line, an ADSL circuit, and a wireless transmission medium, such as infrared rays (e.g., IrDA, remote-controller), Bluetooth (registered trademark), IEEE 802.11, an HDR, a mobile telephone network, a satellite circuit, or a terrestrial digital network may be employed. The present invention is also realizable in the form of a computer data signal that is concretized by electrical transmission of the program code and embedded in a carrier.

INDUSTRIAL APPLICABILITY

The present invention is widely realizable as a variety of displays including various kinds of displays each having a display area that is revealed when the display is pull out.

The invention claimed is:

1. A mobile terminal unit with a pullout display that is to be pulled out from a body of the mobile terminal unit,
the mobile terminal unit comprising:
an amount-of-pullout detector configured to detect a pullout amount of the pullout display in relation to the body of the mobile terminal unit, pullout amount being detectable at a plurality of pullout display positions between and including fully retracted and fully extended;
a display controller configured to cause the pullout display to show changeable information in a proportion based on the pullout amount detected by the amount-of-pullout detector, and to adjust the proportion of the shown information upon a detected change in the pullout amount; and
a touched-section detector configured to detect a section of the pullout display touched by a user,
the touched-section detector being provided on a front surface of the pullout display and rigidly mounted on the body of the mobile terminal unit.

2. The mobile terminal unit of claim 1, wherein:
the pullout display is flexible; and
the pullout display is in a state of bending when housed in the body of the mobile terminal unit.

3. The mobile terminal unit of claim 1, wherein the information is an image, and the display controller adjusts a size of the image based on the detected pullout amount and displays the size-adjusted image on the pullout display.

4. The mobile terminal unit of claim 1, wherein the information is content, and the display controller displays the content having a size responsive to the pullout amount that is detected.

5. The mobile terminal unit of claim 1, wherein the pullout display needs light given from a back,
the mobile terminal unit further comprising a backlight that emits the light to the pullout display and is allowed to be pulled out along with the pullout display.

6. The mobile terminal unit of claim 1, wherein the pullout display needs light given from a back,
the mobile terminal unit further comprising:
a backlight that emits the light to a part of the pullout display, which part is housed in the body of the mobile terminal unit;
an amount-of-light controller configured to control an amount of light to be emitted from the backlight; and
an amount-of-light detector configured to detect an amount of ambient light around the mobile terminal unit,
the amount-of-light controller controlling the amount of light to be emitted from the backlight in a manner proportional to the amount of ambient light that is detected by the amount-of-light detector.

7. A mobile terminal unit of claim 1, further comprising,
a display moving mechanism configured to automatically move the pullout display to a position corresponding to a display size or aspect of information that is to be displayed on the pullout display.

8. A mobile terminal unit with a pullout display that is to be pulled out from a body of the mobile terminal unit,
the mobile terminal unit comprising:
an amount-of-pullout detector configured to detect a pullout amount of the pullout display in relation to the body of the mobile terminal unit, pullout amount being detectable at a plurality of pullout display positions between and including fully retracted and fully extended;
a display controller configured to cause the pullout display to show changeable information in a proportion based on the pullout amount detected by the amount-of-pullout detector, and to adjust the proportion of the shown information upon a detected change in the pullout amount; and
at least one sound transducer formed as a flexible portion that is allowed to be pulled out from inside the body of the mobile terminal unit along with the pullout display.

9. A mobile terminal unit with a pullout display that is to be pulled out from a body of the mobile terminal unit,
the mobile terminal unit comprising:
an amount-of-pullout detector configured to detect a pullout amount of the pullout display in relation to the body of the mobile terminal unit, pullout amount being detectable at a plurality of pullout display positions between and including fully retracted and fully extended; and
a display controller configured to cause the pullout display to show changeable information in a proportion based on the pullout amount detected by the amount-of-pullout detector, wherein
if the pullout amount is decreased while information is being displayed on the pullout display, the display controlling means shifts the information, relative to the pullout display, in a pullout direction by a distance substantially equal to the decrease in pullout amount, and displays the shifted information.

10. A mobile terminal unit with a pullout display that is to be pulled out from a body of the mobile terminal unit, the mobile terminal unit comprising:
- an amount-of-pullout detector configured to detect a pullout amount of the pullout display in relation to the body of the mobile terminal unit, pullout amount being detectable at a plurality of pullout display positions between and including fully retracted and fully extended;
- a display controller configured to cause the pullout display to show changeable information in a proportion based on the pullout amount detected by the amount-of-pullout detector; and
- an application activator configured to activate a predetermined application in response to a particular detected pullout amount.

11. The mobile terminal unit according to claim 10 wherein a different application is activated when the pullout amount detected is different from the predetermined pullout amount.

12. A mobile terminal unit with a pullout display that is to be pulled out from a body of the mobile terminal unit to be extended, the mobile terminal unit comprising:
- the pullout display, which is flexible to be allowed to bend when housed in the body of the mobile terminal unit, wherein
- the pullout display, when housed in the body of the mobile terminal unit, is bent to form a first substantially planar surface and a second substantially planar surface that are separated by a bent section of the pullout display,
- at least a part of the first planar surface is exposed at a first external surface of the body of the mobile terminal unit to serve as a first display, and
- at least a part of the second surface being exposed at a second external surface, different from the first external surface, of the body of the mobile terminal unit to serve as a second display, the first and second substantially planar surfaces of the pullout display being on different planes while exposed when housed in the body of the mobile terminal unit.

* * * * *